United States Patent [19]
Xiao et al.

[11] Patent Number: 6,162,530
[45] Date of Patent: Dec. 19, 2000

[54] NANOSTRUCTURED OXIDES AND HYDROXIDES AND METHODS OF SYNTHESIS THEREFOR

[75] Inventors: Tongsan D. Xiao, Rocky Hill; Peter R. Strutt, Mansfield Center, both of Conn.; Bernard H. Kear, Whitehouse Station, N.J.; Huimin Chen; Donald M. Wang, both of Storrs, Conn.

[73] Assignee: University of Connecticut, Storrs, Conn.

[21] Appl. No.: 08/971,817

[22] Filed: Nov. 17, 1997

Related U.S. Application Data

[60] Provisional application No. 60/031,355, Nov. 18, 1996, provisional application No. 60/031,672, Nov. 22, 1996, and provisional application No. 60/039,888, Mar. 5, 1997.

[51] Int. Cl.[7] .................................................. D02G 3/01
[52] U.S. Cl. .................. 428/292.1; 428/364; 428/372; 428/401; 428/402
[58] Field of Search ................................ 428/292.1, 372, 428/401, 364, 402

[56] References Cited

U.S. PATENT DOCUMENTS 5,897,945   4/1999   Lieber et al. ........................ 428/323

FOREIGN PATENT DOCUMENTS

| 0 649 818 A1 | 4/1995 | European Pat. Off. . |
| 2 066 963 | 7/1981 | United Kingdom . |
| WO 97/01509 | 1/1997 | WIPO . |

*Primary Examiner*—Christopher Raimund
*Attorney, Agent, or Firm*—Cantor Colburn LLP

[57] ABSTRACT

A chemical synthetic route is disclosed for nanostructured materials that is scalable to large volume production, comprising spray atomization of a reactant solution into a precursor solution to form a nanostructured oxide or hydroxide precipitate. The precipitate is then heat-treated followed by sonication, or sonicated followed by heat treatment. This route yields nanostructured doped and undoped nickel hydroxide, manganese dioxide, and ytrria-stabilized zirconia. Unusual morphological superstructures may be obtained, including well-defined cylinders or nanorods, as well as a novel structure in nickel hydroxide and manganese dioxide, comprising assemblies of nanostructured fibers, assemblies of nanostructured fibers and agglomerates of nanostructured particles, and assemblies of nanostructured fibers and nanostructured particles. These novel structures have high percolation rates and high densities of active sites, rendering them particularly suitable for catalytic applications.

51 Claims, 20 Drawing Sheets

NANOSTRUCTURED OXIDES AND HYDROXIDES AND METHODS OF SYNTHESIS THEREFOR

CROSS-REFERENCE TO RELATED APPLICATIONS

This application claims priority to U.S. Provisional patent application Ser. No. 60/031,355 filed Nov. 18, 1996, U.S. Provisional patent application Ser. No. 60/031,672 filed Nov. 22, 1996, and U.S. Provisional patent application Ser. No. 60/039,888 filed Mar. 5, 1997.

BACKGROUND OF THE INVENTION

1. Field of the Invention

This invention relates to the synthesis of nanostructured materials by chemical methods. In particular, this invention relates to the synthesis of nanostructured oxides and hydroxides via chemical methods, thereby allowing the production of materials of controlled morphology, phases, and microstructures, including a new class of fibrous microstructures which combines a high density of chemically active sites with enhanced fluid percolation rates.

2. Description of the Related Art

Materials having fine-scale microstructures possess unique and technologically attractive properties, as shown by work on rapidly solidified metals, alloys and composite materials wherein grain sizes on the order of a few micrometers (microns) are obtainable. Recently, however, research has focused on reducing grain size from the micrometer to the nanometer range. A feature of such nanostructured materials is the high fraction of atoms (up to 50%) residing at grain or particle boundaries. FIG. 1 illustrates this phenomena schematically, wherein white circles depict grain boundary atoms and solid circles depict interior atoms. The high fraction of the atoms residing in surface boundaries is important in creating a high density of potential sites for catalytic and electrochemical reactions. Nanostructured materials, which refer herein to materials having a grain diameter of about 1 to 100 nanometers (1 nm=10 angstroms) possess substantially different, and in many cases improved, chemical and physical properties compared to their micron-sized grain counterparts of the same chemical composition.

Nanostructured powders have been previously synthesized by chemical methods from aqueous solution. A typical prior art synthesis procedure involves three sequential steps: (1) preparation of an aqueous starting solution of mixed metal salts, (2) reductive decomposition of the starting solution to obtain a colloidal suspension of the desired end-product phase, and (3) separation of the end-product powder by repeated washing and drying. The resulting dried powder products are in the form of loosely agglomerated nanoparticles. Metal chloride solutions can be reduced with sodium trialkylborohydride to form nanostructured powders of nickel or iron, and mixed metal chloride solutions can be reduced to form nanostructured powders of M50 steel, AlN/BN, NiCr/$Cr_3C_2$, and WC/Co.

The synthesis of oxides and hydroxides in nanostructured form facilitates the manufacture of components and devices with modified and/or superior performance. An additional benefit of grain size refinement to the nanoscale range is the elimination of large voids at grain boundaries, which often contribute to deleterious properties. The recent demonstration that nanostructured ceramic materials (i.e., TiO) can be superplastically deformed at relative low temperatures and pressures, as described in the examples in Nanostructured Materials, Vol. 1, 1992, has important implications in net shape forming brittle ceramic and intermetallic components. In industrial coating applications, for example thermal barrier coatings, reduction to the nanoscale is highly effective in increasing thermal impedance. In dense ceramic coatings, nanostructured materials have the potential to provide high hardness combined with good fracture toughness, and corrosion resistance.

High surface-area materials with nanoscale dimensions are of special interest in applications where active-site mediated chemical reactions play a decisive role. In catalytic applications, a high contact area for oxidation and reduction with the surrounding environment is important, and thus reduction of the catalytic material to the nanoscale is clearly a distinct advantage. Catalytic applications include pollution control, such as nuclear waste mitigation, water purification, mercury remediation, particulates remediation, and air filtration, as well as catalysis for synthetic purposes, such as molecular sieves, petroleum refinement, and the like. However, despite a strong interest in the development of nanostructured materials for catalytic applications, the present nanostructured materials suffer from the tendency of the particles to form agglomerates in which the interparticle pore space becomes comparable with the particle size, that is, wherein the interparticle pore space itself has nanoscale dimensions. These small pore sizes limit the percolate rate of the active species into and through the agglomerates.

Another area for the use nanostructured materials is rechargeable batteries and fuel cells, where the high surface area of the nanostructured materials promotes rapid interactions of the active material with the surrounding media. In high energy density rechargeable storage batteries, for example, the need to sustain high current pulses under charging and discharging conditions requires maximum contact between the electrode and electrolyte to achieve a high density of ion and electron carriers. Active nanostructured materials, with their high density of controlled surface defects, address this requirement, thus providing the means to optimize the high energy storage capacity of batteries.

The nickel electrode in particular has a ubiquitous and critical presence in rechargeable batteries, as it is generally the capacity-limiting electrode in Ni-Cd, Ni-Zn, Ni-$H_2$ and Ni-MH cells. Previous studies have shown nickel hydroxide (Ni(OH)$_2$) can be formed by cathodic deposition from solution, and by precipitation from concentrated alkali. Traditional nickel electrodes are fabricated from a porous nickel plaque made from nickel carbonyl powder, Ni(CO)$_4$. Porosity is typically limited to 80%, and the volume take-up by the sheet and plaque is near 20%. This plaque is then either chemically or electrochemically impregnated with active material. Japanese workers have pioneered the development of a high-performance spherical nickel hydroxide (Japanese Tanaka) for application in foam or sintered fiber mat nickel electrodes. These substrates are highly porous (about 95%) so that a large volume of active material can be loaded into the electrodes. This represents a radical departure from the traditional use of sintered carbonyl nickel-type electrodes that require complex manufacturing processes to either chemically or electrochemically deposit the active material within the porosity of the plaque.

Nickel hydroxide materials have not yet been synthesized in a nanostructured form. In current practice, micron-sized nickel hydroxide is synthesized by chemical precipitation and electrolytic deposition. Work on micron-scale nickel hydroxide-based materials indicates three forms of crystal structure, namely the hexagonal α- and β-phases and the cubic γ-phase. In nickel electrode applications, the β-phase is usually used because of its stability during charge-discharge cycle process. However, a-nickel hydroxide, although unstable in the charge-discharge cycle, is capable of storing a higher amount of energy due to a higher valence charge. Current nickel electrodes are less than ideal because of the low volumetric energy density of the active materials. The theoretical x-ray density of nickel hydroxide is 4.15 g/cc, but the present electrode can only achieve a density of 1.8 g/cc. This is primarily due to the large micro-sized voids associated with the processed electrodes when using conventional nickel hydroxide.

Manganese dioxide ($MnO_2$) is also not presently available in a nanostructured form. The particle size in both naturally occurring and commercially synthesized manganese oxide is on the micron, or even millimeter scale. Naturally occurring manganese dioxide is extremely impure, with a number of oxide impurities, such as $SiO_2$, $Fe_2O_3$, $Al_2O_3$, and $P_2O_5$. These impurities complicate the chemical and structural analysis of naturally-occurring manganese dioxide, and limits its range of applications.

Much interest has therefore been focused on methods for the synthesis of manganese dioxide, including ion exchange, hydrothermal synthesis, electrolytic synthesis, and chemical synthesis. Chemical methods developed in the 1970's yield pure, micron-sized manganese dioxide in a variety of crystalline forms. Subsequent syntheses by the reaction of manganese salts ($MnCl_2$ or $MnSO_4$) with a strong oxidizer ($KMnO_4$ or a mixture of ozone and oxygen) results in layered manganese dioxide. However, little or no attempt has been made to produce manganese dioxide materials on the nanostructured scale or with a controlled morphological form.

Crystallographic studies reveal that at the molecular level manganese dioxide is constructed from $MnO_6$ octahedrons, each consisting of six oxygen atoms surrounding a manganese atom. The octahedrons are linked at their vertices and edges to form single or double chains. These chains share corners with other chains, leading to structures with tunnels or channels formed by rows of atomic empty sites. The size of these channels is related to the number of manganese-oxygen chains on each side. The presence of channels facilitates the transport of mobile ionic species, including $Li^+$, $H^+$, $K^+$, $Ba^{+2}$, $Na^+$, or $Pb^{+2}$. This feature is important because such cation exchange enhances both catalytic properties for oxidation reactions, and good ionic/electronic conduction for energy storage batteries.

Zirconia ($ZrO_2$) is another oxide of particular interest because of its chemical stability, high hardness, refractory nature (ability to withstand high temperatures), and ionic conductivity. Structurally stabilized zirconia is widely used in thermal barrier coatings for advanced engines, which are subject to extremely high temperatures. Other uses of zirconia include milling balls, refractors, oxygen sensors, and fuel cells batteries, as well as electronic ceramics.

Zirconia has a monoclinic structure at low temperatures, but exists in different forms at elevated temperatures. For example, undoped zirconia with the monoclinic structure transforms near 1170° C. to the tetragonal structure, and then near 2370° C. to the cubic structure. This transformation is accompanied by a volume change, which can lead to mechanical damage of parts. The presence of lower-valance cations such as $Mg^{+2}$, $Ca^{+2}$, $Y^{+3}$, and rare earth cations stabilizes the high temperature phases to lower temperatures so that metastable tetragonal or cubic phases can exist down to ambient temperature.

Methods used to produce conventional micro-scale stabilized $ZrO_2$ includes co-precipitation, microemulsion, and sol-gel synthesis. Current techniques for synthesizing nanostructured zirconia and yttria-stabilized zirconia ($Y_2O_3$/$ZrO_2$) are not economic as commercial processes. The inert gas condensation (IGC) and chemical vapor condensation (CVC) methods are inherently slow and thus not cost effective, while nanoparticles produced by sol-gel synthesis are heavily agglomerated.

As can be seen by the above discussion, despite recent developments in the synthesis of nanostructured materials, there still remains a need for materials and methods which are economical, and which produce materials which are suitable for a wide range of industrial applications. There remains a particular need for materials suitable for catalytic applications, that is, materials having a high density of active sites, and yet good percolation rates.

SUMMARY OF THE INVENTION

The deficiencies of the prior art as discussed above are overcome or alleviated by the materials and methods of synthesis of the present invention, wherein nanostructured metal oxides and hydroxides are produced by an aqueous chemical solution processing method comprising providing an aqueous starting solution and an aqueous reactant solution, at least one of which comprises a precursor salt of the oxide or hydroxide; atomizing the aqueous reactant solution and the aqueous starting solution into the aqueous starting solution to provide a nanostructured powder; heat-treating the nanostructured powder to yield the desired crystalline phase; isolation of the crystalline phase; ultra-sonication of the crystalline phase to disintegrate any powder aggregates and to introduce lattice defects into the nanocrystalline particles; and spray-drying the ultrasonicated powders to produce nanostructured spherical powder agglomerates. This method allows extremely rapid nanoparticle nucleation and suppressed nanoparticle growth, which results in high-volume production of nanostructured powders having a high density of active sites.

An important feature of this invention is that the method is a simple, economic process providing a general synthetic method for a variety of nanostructured metal oxides and hydroxides and other materials with improved properties and controlled morphology and microstructure. The oxides and hydroxides have a particle size in the range from about 1 to 100 nm, and preferably less than about 10 nm. The nanostructured particles are preferably in the form of agglomerates, wherein the agglomerates have diameters in the range from about 0.1 to 200 microns, preferably from about 1 to 100 microns, and most preferably about 20 microns. The agglomerates are preferably porous, wherein the pores have diameters in the range from about 0.5 nm to 20 nm, preferably about 1 nm to 10 nm, and preferably about 5 nm, or such that the nanostructured particles are nearly touching each other.

In another embodiment of the present invention, a new class of nanostructured materials is presented, characterized the presence of fibers having diameters on the nanometer scale. The presence of these nanostructured fibers results in materials having a high density of active sites, together with enhanced fluid (gas or liquid) percolation rates. In one form, these materials comprise a mass of high surface area nanostructured agglomerates, wherein the agglomerates are spatially separated from one another by nanostructured fibers of in the form of a random, interconnected open weave. In another form, the materials comprise nanostructured particles adhered to nanostructured fibers in the form of a random, interconnected open weave. In a third form, the materials comprise nanostructured fibers in the form of a random, interconnected open weave. The agglomerates nanostructured particles, the nanostructured particles, or the fibers themselves provide a high density of active sites for the promotion of solid/fluid (gas or liquid) reactions, while the nanostructured fibers provide a relatively easy path for percolation of the reactive fluid. A high reaction rate thus results from the high density of active sites, as well as the short diffusion distances into and out of the chemically active agglomerates, particles, or fibers.

This new structure is observed in both nanostructured nickel hydroxide and manganese dioxide synthesized by the method of the present invention. The nanostructured fibers have diameters of less than about 100 nm, preferably less than about 50 nm, and most preferably in the range of about 5 to 10 nm, and an aspect ratio (length/diameter) of greater than about 10. The nanostructured fibers are spaced between about 0.5 and about 200 nm apart, and preferably about 5 to 50 nm apart, or wherein the fibers are nearly touching. The porosity of the nanostructured fiber open weave is preferably preferably greater than about 60 volume %, and more preferably greater than about 80 volume %, which contributes to the high percolation rate of the material. Where present the individual agglomerates within the weave have diameters in the range from about 0.1 to 200 microns, preferably about 1 to 100 microns, and most preferably about 20 microns. These composite nanostructured agglomerates/fibers preferably comprise greater than about 60 volume % of agglomerates of particulate material, and preferably greater than about 90 volume %.

In another embodiment of the present invention, nanostructured particulate nickel hydroxide powders are provided. Such nickel hydroxide powders are useful as positive nickel electrode active materials, the powders having a high surface area to provide an optimal degree of contact between the electrode and the electrolyte, and a controlled degree of defects (both intrinsic and extrinsic) to facilitate intercalation of the conductive species or the rapid movement of both electrons and ions in the processed electrode.

In another embodiment of the present invention, nanostructured particulate metal-doped nickel hydroxide powders are synthesized. These powders are suitable for use as active materials for electrodes in advanced, high-energy storage batteries, where high current pulses under both charging and discharging conditions are critical.

In still another embodiment of the present invention, nanostructured particulate manganese dioxide and metal-doped manganese dioxide are synthesized. Nanostructured manganese dioxide is useful as positive electrode active materials, as it has a high surface area to provide an optimal degree of contact between the electrode and electrolyte, as well as a controlled degree of defects (intrinsic and extrinsic) to facilitate intercalation of the conductive species or the rapid movement of both electrons and ions in the processed electrode. The nanostructured metal-doped manganese dioxide is useful in high-energy storage battery electrodes. The nanostructured manganese dioxide is also synthesized with controlled defect structure, morphology, and microstructures for a variety of applications including advanced catalysts, fuel cells and pollution control devices.

In still another embodiment of the present invention, nanostructured particulate yttria-stabilized zirconia is provided for applications in advanced high temperature ceramics and thermal barrier coatings.

The method in accordance with the present invention may also be used to provide hard metal oxide and hydroxide ceramic materials for wear-, corrosion- and erosion-resistant coating applications, as well as metal oxide and hydroxide ceramic materials for consolidation into bulk components and devices. The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 12A–13E schematically show the transformation to a bird's nest structure of manganese dioxide in accordance with the present invention of (A) nanoparticle agglomerates (B) nucleated embryonic nanofibers (C) transformed long fibers, (D) interpenetrating fiber bundles, and (E) fully developed bird's-nest.

DETAILED DESCRIPTION OF THE INVENTION

In accordance with the method of the present invention, nanostructured metal oxides and hydroxides are produced by an aqueous chemical solution method comprising providing an aqueous starting solution and an aqueous reactant solution, at least one of which comprises at least one precursor metal salt; atomizing the reactant solution into the starting solution to provide a nanostructuredpowder; heat-treating the nanostructured powder to yield the desired crystalline phase; isolation of the crystalline phase; ultra-sonication of the crystalline phase to disintegrate any powder aggregates and to introduce lattice defects into the nanocrystalline particles; and spray-drying the ultrasonicated powders to produce nanoporous spherical powder agglomerates of nanostructured particles. This method allows extremely rapid nanoparticle nucleation and suppressed nanoparticle growth, which results in high volume production of nanostructured powders. These nanostructured oxide and hydroxide materials are suitable for a range of applications, including highly active catalysts, rechargeable batteries, fuel cells, and molecular sieves; highly porous structures facilitating the percolation of reactant gaseous and liquid phases, with concomitant exposure of the reactant gaseous or liquid phases to a high density of reactive sites within the nanostructured materials assemblies; porous ceramic materials for thermal barrier coatings; dense ceramic coatings; and powders for bulk consolidation to produce nanostructured ceramic components. The method is also suitable for the production of other nanostructured material compositions.

Figure 1:
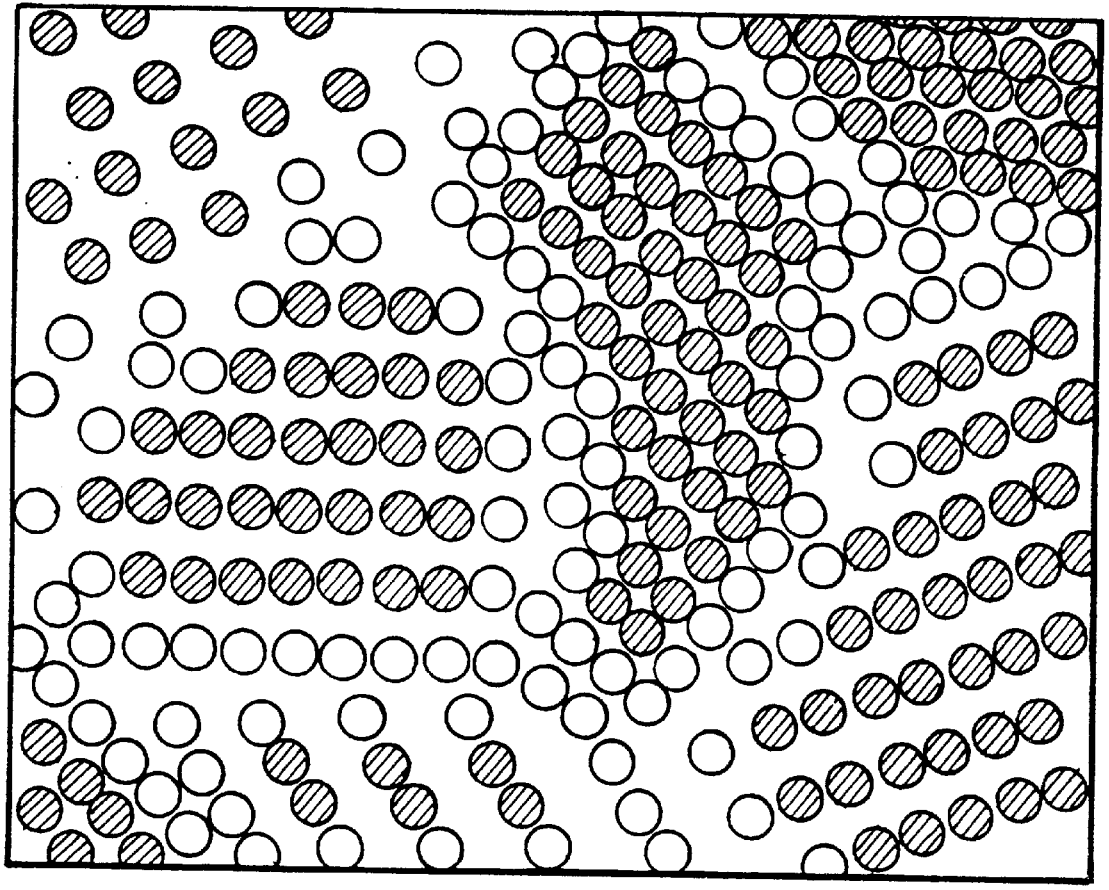
FIG. 1 is a schematic representation of a known nanostructured material, showing the high fraction of atoms residing at grain or particle boundaries.
Figure 2:
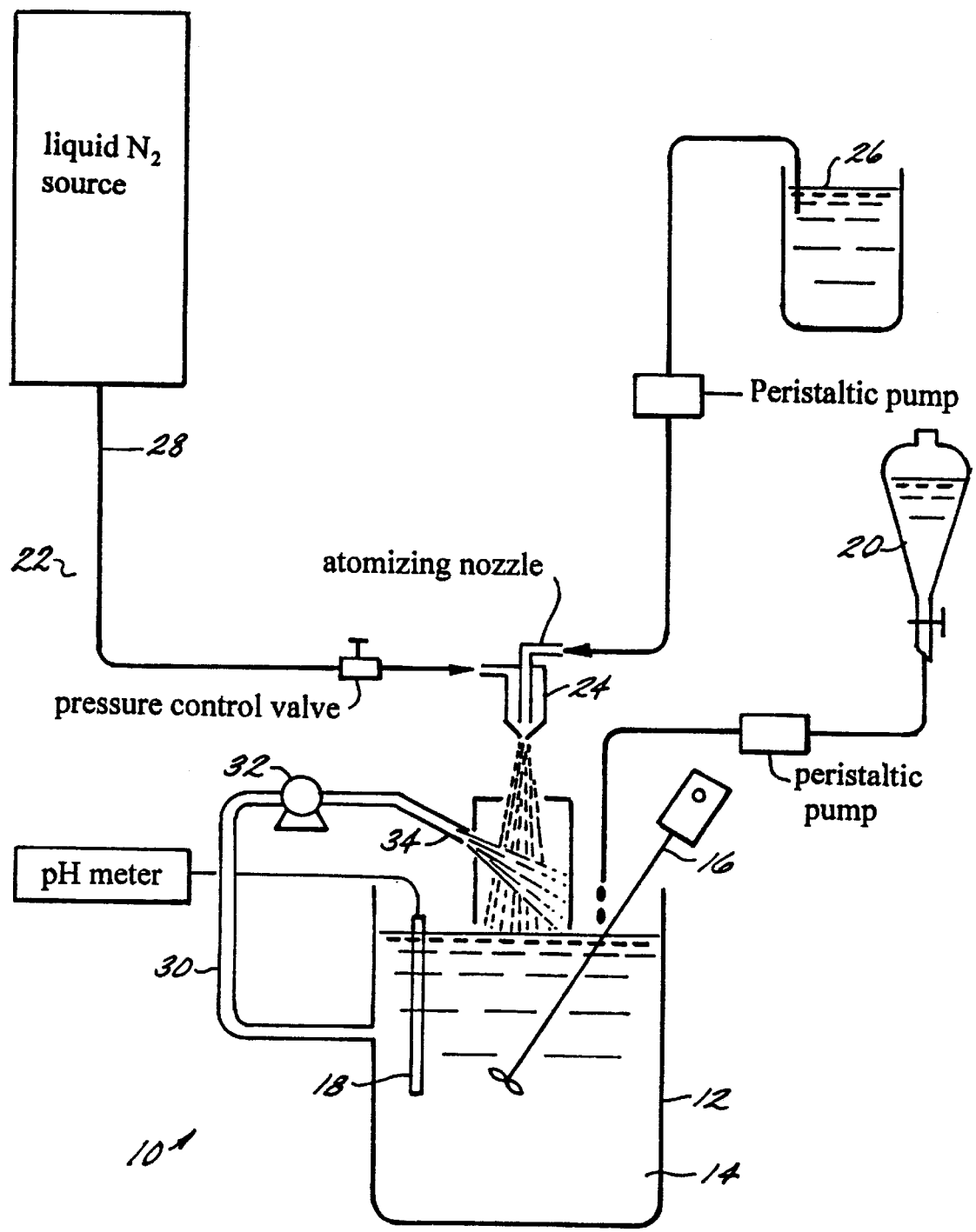
FIG. 2 is a schematic diagram of an apparatus suitable for use in the aqueous solution method in accordance with the present invention.

An apparatus suitable for the production of nanostructured materials, including oxides and hydroxides, by the method of the present invention is shown in FIG. 2. Apparatus 10 comprises reaction vessel 12 containing starting solution 14, equipped with a stirrer 16, pH electrode 18, base or oxidizer source 20, and atomization assembly 22. Atomization assembly comprises nozzle 24 for delivery of reactant solution 26. As shown in FIG. 2, the atomization may be by pressurized gas 28, e.g., $N_2$ or by sonication (not shown). The assembly further comprises conduit 30 fitted with a high-capacity pump 32 for the recirculation of starting solution 14. Recirculated starting solution 14 is atomized into reaction vessel 12 by nozzle 34. Simultaneous atomization of both starting solution 14 and reactant solution 26 into reaction vessel 12 allows mixing of the reactants at the molecular level.

The general procedure for the synthesis of nanostructured oxides and hydroxides in large quantities first requires synthesis of a nanostructured oxide or hydroxide via precipitation from a mixture of an aqueous starting solution and an aqueous reactant solution. The aqueous solutions are prepared from water-soluble chemicals, and comprise at least one metal or rare earth precursor salt, and oxidizers and/or bases, depending on the composition of the produced oxide or hydroxide. The starting solutions may further comprise at least one additional metal or rare earth salt, to yield a range of metal-doped nanostructured powders with tailored chemical, structural, and performance characteristics.

The precipitation is initiated by atomizing the reactant solution and the aqueous starting solution into a reaction vessel containing the aqueous starting solution. As used herein, the "reactant solution" is the solution which is atomized, and the "starting solution" is the solution in vessel 12, which is pumped through conduit 30 and atomized into an aerosol to meet the atomized reactant solution. These are terms of convenience only, as the below description and examples clearly show that the precursor metal salt (or salts) may either be dissolved into the reactant solution or the starting solution, depending on the composition of the particular oxide or hydroxide synthesized. The atomization may be by pressure or ultrasonication. Use of co-atomization to mix the starting and reactant solutions means that nucleation and growth of the nanostructured powder precipitate can be precisely and reproducibly controlled. The precipitate may be in the form of an amorphous powder, a partially crystalline powder, or a crystalline powder. Process parameters which affect the composition, morphology, and yield of the nanostructured oxide or hydroxide precipitate include solution pH, precursor and other reactant concentration, and solution delivery rate.

After precipitation, the nanostructured powders are aged or heat-treated for a length of time effective to transform the completely or partially or crystalline nanostructured powders into the desired crystalline state. This procedure is critical, since it serves to stabilize the nanocrystal structure. Process parameters which affect the morphology and yield of the nanocrystalline powder product include temperature of heating, time of heating, and solution pH.

After aging or heat-treating, the nanocrystalline powders are generally isolated by filtration and washed to remove by-products, preferably using deionized, distilled water or other suitable solvent.

The next step is ultrasonication of a suspension of the nanocrystalline particles using an intense ultrasonic probe. Ultrasonication disintegrates any powder aggregates and introduces lattice defects into the nanocrystalline particles. These defects can exert an important influence on the performance of nickel hydroxide, for example, when it is used as the active material in a nickel electrode. Parameters which affect the final product include ultrasonic power and processing time.

The final step is generally spray-drying of the ultrasonicated nanoparticle suspension to produce nanoporous spherical powder agglomerates. This procedure produces agglomerates of nanostructured particles, wherein the agglomerates have diameters in the range from about 0.1 to 200 microns, preferably from about 1 to 100 microns, and most preferably about 20 microns. During spray-drying, rapid evaporation occurs as the spray droplets contact the hot air stream to produce a saturated vapor film. Continued evaporation depends on the diffusion rate of the moisture through the surface shell. As the shell thickness increases with time there is a corresponding decrease in the evaporation rate. Since evaporation is an endothermic process, the droplet surface remains cool until the evaporation is complete, even though the gas stream can be fairly hot. Use of aerosol spray-drying ensures that the end-product powder (i.e., $Ni(OH)_2$) is free of undesirable phases that might be produced by heating above 200° C. Relevant processing parameters include the precursor delivery rate, inlet and outlet gas temperature, and suspension concentration.

Variants of the five above-described sequential steps are used in synthesizing nanostructured materials of specific compositions. For example, in the synthesis of yttria-stabilized zirconia, the precipitated powders are first isolated and then ultrasonicated, followed by heat treatment. The heat-treated powders are then dispersed in a aqueous binder, for example polyvinyl alcohol (PVA) before spray-drying.

The techniques used to control the kinetics of the chemical reactions and the nucleation and growth of precipitated phases are critical to the practice of the present invention. These critical techniques include (i) the use of atomization to combine the precursors reactants; (ii) heat treatment of the reactant solutions at selected pHs and reaction times; (iii) ultrasonic treatment of the nanostructured powder suspensions; (iv) the use of surfactants, and (v) spray-drying the nanoparticles to produce the desired agglomerates of controlled porosity. Specific morphological forms may be produced by the selection of appropriate process parameters in (i) to (v) above.

Materials synthesized in accordance with the present invention include nanostructured particulate and fibrous nickel hydroxide, and nanostructured particulate nickel hydroxide doped with metals including but not limited to Co, Al, Cd, Mn, Zn, and other transition metals. Particulate and fibrous nanostructured manganese dioxide, and particulate and fibrous nanostructured manganese dioxide doped with Co, Fe, Pt, and other additives are also been accessible, as well as particulate nanostructured yttria-stabilized zirconia. Other pure, mixed, or complex oxides and hydroxides suitable for synthesis by the above-described methods comprise aluminum, silicon, magnesium, zinc, molybdenum, yttrium, zirconium, copper, cobalt, vanadium, silver, titanium, iron, nickel, and tungsten, as well as other rare earth metals. These and other elements known in the art, such as alkali metals, noble metals, and semi-conductive metals may also be used as dopants.

Figure 3A:
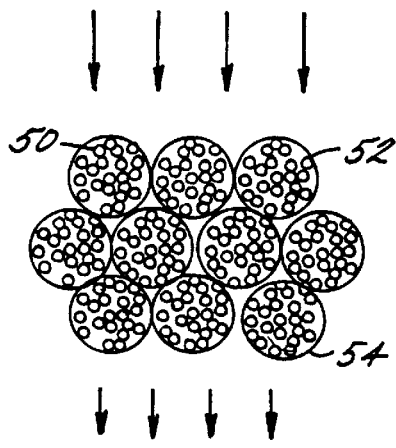
FIGS. 3A–3D are schematic representations of (A) agglomerates of nanostructured particles in accordance with the present invention having a low permeability rate; (B) bimodal (mixed) composites of agglomerates of nanostructured particles with nanostructured fibers in accordance with the present invention having a intermediate permeability rate; (C) composites of nanostructured particles with nanostructured fibers in accordance with the present invention having a higher intermediate percolation rate; and (D) a random weave, open, nanostructured fiber assembly in accordance with the present invention having a high permeability rate.

In particular, the practice of the method of the present invention results in the synthesis of a new class of nanostructured materials comprising fibers having diameters on the nanometer scale. The presence of these nanostructured fibers results in materials having a high density of active sites, together with enhanced fluid (gas or liquid) percolation rates. FIG. 3 illustrates the novel structures of the present invention compared with the particulate agglomerates of the present invention. As shown in FIG. 3A, fluid or gas in contact with agglomerates 50 of nanostructured particles 52 is limited to the surface 54 of the agglomerate 50.

Figure 3B:
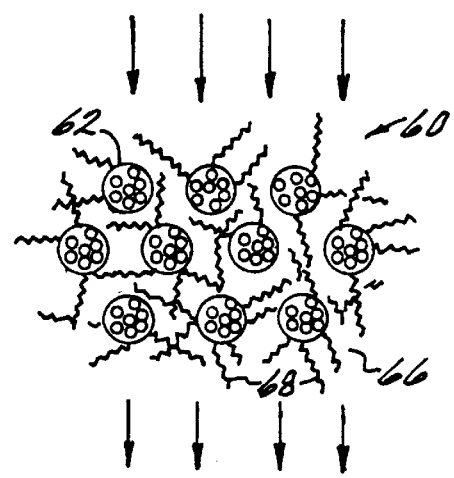
Figure 3C:
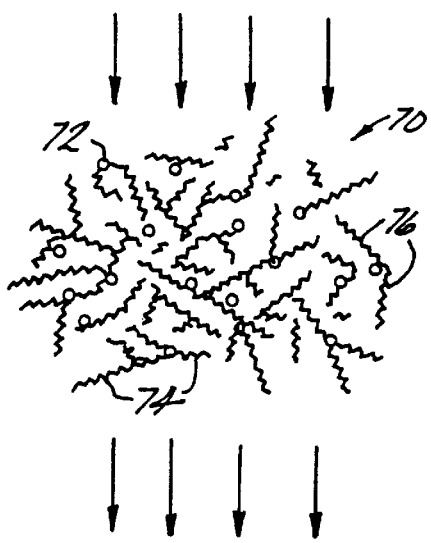

A first form of the novel morphology of the present invention is shown in FIG. 3B, wherein the composites 60 of the present invention comprise agglomerates 62 of nanostructured particles 64 having a high density of active sites for promoting fluid/solid reactions, and a fibrous, open-weaved assembly 66, which provides a relatively easy path for percolation of the reactive fluid or gas through composite 60. The reactants passing through the nanostructured fibers 68 making up the assembly 66 are thus continually exposed to the nanoparticulate agglomerates. The short diffusion distances into and out of the chemically or catalytically active agglomerates ensures a high reaction rate.

In a second form of the novel morphology in accordance with the present invention (FIG. 3C), composite 70 comprises nanostructured particles 72 adhered to nanostructured fibers 74 in the form of a random, interconnected open-weave assembly 76. Again, the open, fibrous assembly 76 provides a relatively easy path for percolation of the reactive fluid or gas through composite 70, and the reactants passing by the nanostructured fibers 74 of are thus continually exposed to the nanostructured particles 72. The short diffusion distances into and out of composite 70 ensures a high reaction rate.

Figure 3D:
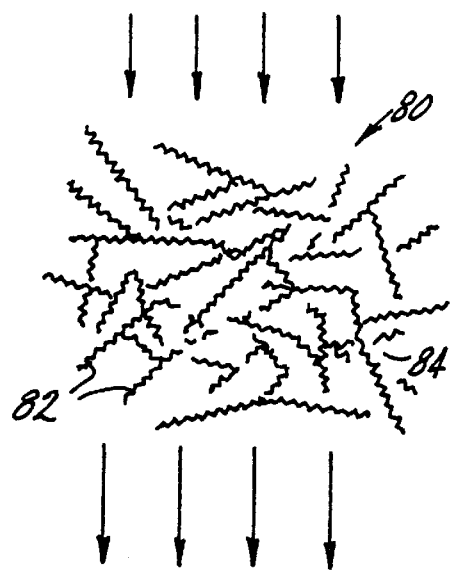

As shown in FIG. 3D, a third form 80 comprises nanostructured fibers 82 in the form of a random, interconnected open weave assembly 84. Here, the fibers themselves provide the high density of active sites for the promotion of solid/fluid (gas or liquid) reactions.

These new structures are readily formed by the synthetic process of the present invention under the conditions described in detail below. Under these conditions, agglomerates of nanostructured particles are gradually transformed into fibrous entities, each of which comprises a three-dimensional, random, open weave of nanostructured fibers. The transformation proceeds from the external surface into the core of the original agglomerates of the nanostructured particles. Complete transformation yields an open-weave structure having a typical volume density of less than about 20%. The nanostructured fibers have diameters of less than about 100 nm, preferably less than about 50 nm, and most preferably in the range of about 5 to 10 nm, and an aspect ratio (length/diameter) of greater than about 10.

Relatively small variations in the synthetic conditions give rise to large variations in size, shape, and distribution of both the original nanoparticle agglomerates and the resulting nanostructured fibers and assemblies. For catalytic and other applications, the transformation is preferably allowed to proceed to only partial completion, resulting in a structure wherein the original agglomerates of nanostructured particles are separated by a thin layer of interconnected nanostructured fibers. This composite morphology results in structures having a high active site density and high surface area, as well as enhanced percolation rates through the inter-agglomerate space. Variation of the relative volume fractions of the agglomerates of nanostructured particle and nanostructured fibers, or of the nanostructured particles and the nanostructured fibers results in variation of the degree of chemical reactivity and the fluid percolation rate, and thus allows optimization of the material for a specific application. For some applications, the nanostructured fibers are preferably spaced between about 0.5 and about 200 nm apart, preferably between about 5 and about 50 nm apart, or nearly touching. The porosity of the nanofiber open weave is preferably greater than about 60 volume %, and more preferably greater than about 80 volume %, which contributes to the high percolation rate of the material. The composites preferably comprise greater than about 60 volume % of agglomerates or nanostructured particles, and preferably greater than about 90 volume %.

The observed nanoparticle/nanofiber transformation involves a significant reduction in the surface area of the material. Without being bound by theory, the transformation is an example of a coarsening mechanism operating in the solution phase, with the reaction driven primarily by the reduction in surface energy. A likely mechanism is fiber growth by gradual dissolution of the nanopowder in the liquid phase, followed by liquid phase transport of the dissolved species to the growing tips of the nanofibers. This simple coarsening mechanism should be common to many other material systems, such that the present invention should be applicable to a wide variety of compositions.

The new materials described herein are useful for a wide range of catalytic applications, including pollution control devices, fuel cells, rechargeable batteries, molecular sieves, and synthetic catalysts. Pollution control devices include those having air or liquid filters for automobile or other transportation applciations or for homes, offices and buildings.

Another application in this field is large-area deposition of catalytic coatings, for example by electrophoretic deposition, where the application of an electric field across an electrostatically-stabilized colloidal suspension provides the driving force for the coating process. This process is particularly well suited for the deposition of nanostructured materials, since electrophoretic mobility (drift velocity divided by electric field) is independent of particle size. Another advantage is its ability to rapidly deposit uniform coatings on complex geometric shapes, such as the various filters used in automobiles, airlines, and other vehicles.

There is also a strong need for pollution control devices that can mitigate particulate materials having a size on the order of several microns, and devices that can reduce the content of CO, $SO_x$, and $NO_x$. Nanostructured materials having high percolation rates are well-suited in this area. Other applications include water purification, air filtration, mitigation of heavy metals such as mercury, and mitigation of nuclear waste.

Regarding fuel cell applications, current fuel cells use expensive noble alloys, for example platinum in phosphoric acid cells, and platinum-ruthenium in direct methanol cells. In the phosphoric acid cells the platinum particles are mixed with a graphitic carbon support, in order to maximize the utility of the active site material. Using nanostructured fiber-containing manganese dioxide, the platinum is chemically dispersed (i) within tunnel sites, (ii) substitutionally on manganese lattice sites, and (iii) on surface sites. This innovative approach boosts the power density of the fuel cells, as well as extends their lifetimes. In solid state fuel cells, the high-density of active sites in the nanostructured materials of the present invention is utilized in the form of a nanoporous zirconia thin film fuel cell. This type of fuel cell compares favorably to present state-of-the-art high temperature solid state fuel cells.

Another major area of application for the nanostructured fibers of the present invention, especially manganese dioxide fibers, is in rechargeable batteries. Nanostructured fibrous lithium-doped manganese dioxide is ideal for use in rechargeable batteries, due to the facility with which the lithium cations can diffuse into and out of the molecular cages in the manganese dioxide defect structure. In general, such nanofibrous structures also make excellent cation-exchange materials. Moreover, with surface areas of greater than about 250 $m^2/g$, they are outstanding catalytic materials for oxidative reactions, and excellent ionic/electronic conductors for high energy storage batteries. This type of material also has applications in zinc-air battery systems.

Nanostructured fibers of manganese dioxide have a molecular tunnel that is 4.6 angstroms×4.6 angstroms. As indicated by the surface area analysis, two types of porosity exist in the synthetic material: (i) nanometer-scale porosity, having a pore size of about 2 to 20 nm; and (ii) angstrom-scale porosity, having a pore size of about 5.6 angstrom and 9.2 angstrom. This suggests applications as molecular sieves, e.g. for removal of unwanted organic species from petroleum products.

Due to the special characteristics of manganese dioxide, its acidity can be modified by doping with different metals. Metal-doped manganese dioxide can serve as either an acid-base or oxidation-reduction catalyst. Previous work on manganese oxide nodules has indicated that manganese dioxide is particularly effective in the decomposition of alcohols, oxidation of carbon monoxide, reduction of $NO_x$, hydrogenation, demetallization of petroleum residues, decomposition of organic sulfur compounds, decomposition of organic nitrogen compounds, decomposition of asphalt, and conversion of $NO_x$, $SO_x$, ozone, and similar reactions.

The various embodiments of the invention is further illustrated by the following non-limiting Examples.

EXAMPLE 1

Nanostructured Nickel Hydroxide

A. Nanostructured Particulate $Ni(OH)_2$

The starting materials used to prepare nanostructured nickel hydroxide powders include nickel nitrate hexahydrate $(Ni(NO_3)_2 \cdot 6H_2O)$, nickel chloride hexahydrate $(NiCl_2 \cdot 6H_2O)$, or nickel sulfate $(NiSO_4 \cdot 6H_2O)$, sodium hydroxide (NaOH), and sodium carbonate $(Na_2CO_3)$. The synthesis of nanostructured $Ni(OH)_2$ by reaction of nickel halide with sodium hydroxide can be written according to the following reaction:

$$Ni(NO_3)_2 \text{ (aq)} + 2NaOH \text{ (aq)} \rightarrow Ni(OH)_2 \text{ (s)} + 2NaNO_3 \text{ (aq)} \quad (1)$$

The formation of nanostructured high surface area $Ni(OH)_2$ depends on the reactant solution pH, control of the nucleation sites by the atomizing spray of the reactants, annealing time and temperatures during refluxing with controlled pH, and ultrasonic agitation of the precipitates. Synthesis of approximately 1 pound of nanostructured $Ni(OH)_2$ is described below.

First, an aqueous precursor solution is prepared from 1700 grams $Ni(NO_3)_2 \cdot 6H_2O$ dissolved in 15 liters of distilled, deionized water. Precipitation occurs by co-atomizing a sodium hydroxide and/or sodium carbonate reactant solution into the recirculated starting nickel salt solution via a pressurized nozzle at a rate of 2.5 liters/hour in order to maintain the desired pH in the range from about 7 to 12. Higher pHs result in heavily agglomerated particles, while lower pHs do not allow complete reaction. Upon co-atomization of the starting and reactant solutions, a green colored suspension is formed that contains the turbostratic form of $Ni(OH)_2$ (a turbostratic structure is between amorphous and crystalline). Alternatively, $NiCl_2$ may also be atomized into the starting material by a second nozzle.

After precipitation, the suspension is then heat treated at about 65° C. for 2–12 hours while maintaining the pH in the range between about 7 and 12, which converts the turbostratic crystal structure to the more stable form. This procedure is critical, since it serves to stabilize the nanocrystalline structure of the Ni(OH)$_2$ and its electronic properties. The suspension is then isolated by filtration and washed with distilled, deionized water remove sodium nitrate and other unwanted by-products.

The nanocrystalline Ni(OH)$_2$ is then resuspended in distilled, deionized water and is ultrasonicated using an intense ultrasonic probe (500 watts power output, 6-inch length and 1-inch diameter equipped with a continuous processing flowcell). Ultrasonication breaks up any powder aggregates, and introduces surface defects as well as lattice defects into the nanocrystalline particles. These effects can exert an important influence on the performance of the active material in the nickel electrode.

Finally, the nanoparticle suspensions are preferably spray-dried to form nanoporous spherical powder agglomerates having diameters in a preferred range of about 1 to 20 microns. Spray-drying facilitates subsequent powder handling and processing. Spray-drying is preferably conducted so as to effect rapid and efficient drying of the aerosol, in order to obtain a homogeneous, fully-dried powder product, but at the same time so as to preserve structural water and to avoid overheating of the powder. The preservation of structural water in nickel hydroxide powder is critically important since it will ultimately affect the properties of the active nickel hydroxide material in the processed electrode, for example the percent of materials utilization, as well as charging and discharging characteristics. Control of temperature is important as it is known that Ni(OH)$_2$ undergoes an undesirable phase transformation at temperatures greater than about 200° C.

Figure 4:
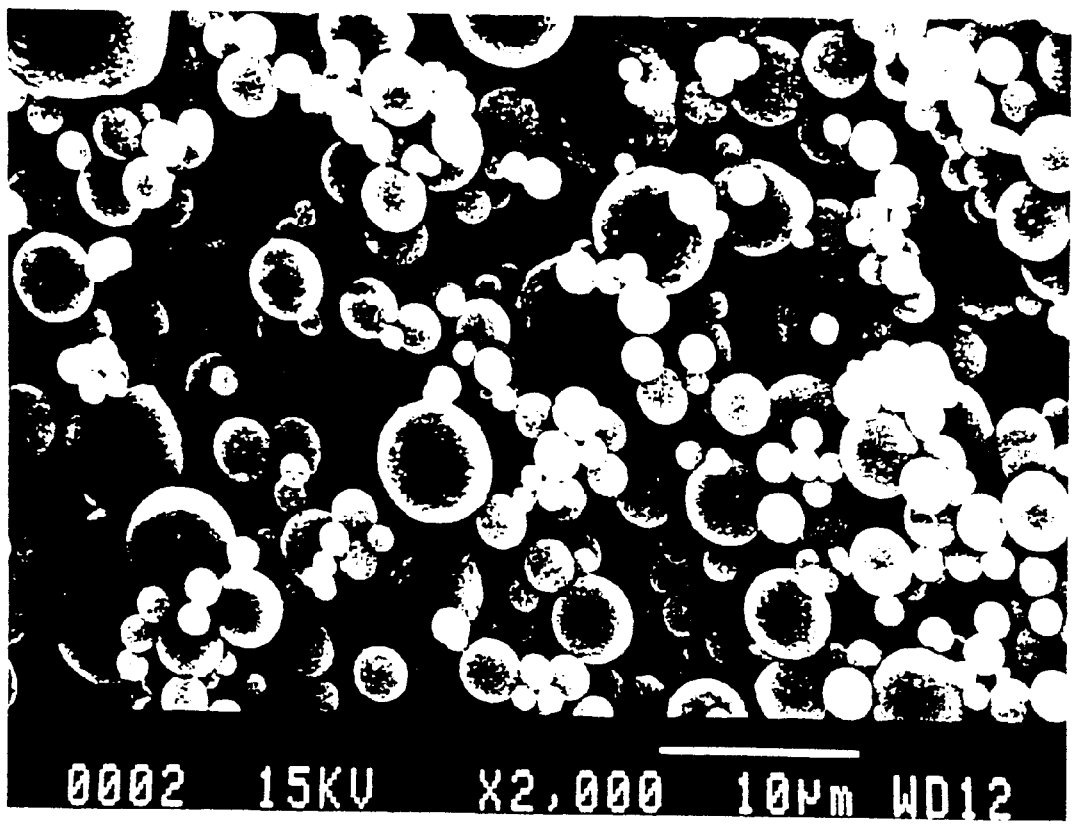
FIG. 4 is a scanning electron microscope (SEM) view of nanostructured $Ni(OH)_2$ in accordance with the present invention, showing spherical morphology.
Figure 5A:
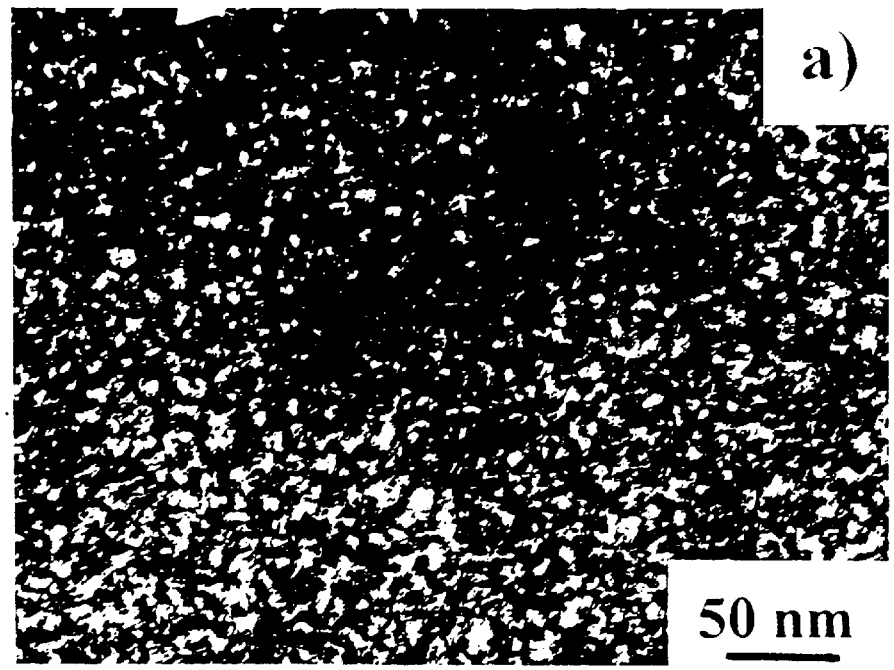
FIGS. 5A and 5B are transmission electron microscope (TEM) views of nanostructured $Ni(OH)_2$ in accordance with the present invention showing (A) equiaxed grains; and (B) a mixture of highly porous nanofibers and equiaxed particles.

The synthetic nanostructured powder has a P-Ni(OH)$_2$ structure, based on x-ray diffraction (XRD) analysis. SEM micrographs (FIG. 4) of the spray-dried powders show that they are spherical solid particles with diameter in the range from about 1 to 20 microns, although no detailed information is revealed. TEM studies, however, show that the spray-dried nickel hydroxide particles are agglomerates of many small nanostructured particles having diameters ranging from 2 nm to several tens of nanometers, with the majority of the particles being less than 10 nm (FIG. 5A). Average particle size is calculated from x-ray peak broadening to be about 5 nm.

The β-Ni(OH)$_2$ consists of a sandwich type structure with a plane of nickel atoms between an array of oxygen atoms (OH). The theoretical x-ray density of the active β-Ni(OH)$_2$ material is about 4.15 g/cc. The actual density of conventional nickel hydroxide material is about 1.6 g/cc to 1.8 g/cc. The present Japanese Tanaka spherical powders referred to above can have a packing density up to 2.1 g/cc. The nanostructured nickel hydroxide of the present invention can reach up to theoretical packing density under superplastic conditions. Clearly, when compared to the current available materials, nanostructured nickel hydroxide offers greatly improved packing and energy storage density.

B. Nanostructured Particulate Ni(OH)$_2$ Doped With Cobalt and Other Transition Metals The experimental procedures for the synthesis of cobalt-doped Ni(OH)$_2$ is essentially the same as described above. Co(NO$_3$)$_2$ with selected atomic ratios (1–20 atom %) is added to the Ni(NO$_3$)$_2$ aqueous solution prior to atomization. X-ray analysis of the heat-treated powders and the spray-dried powders indicates that the cobalt-doped material possesses a P-Ni(OH)$_2$ crystal structure, with no other phases being found. The morphologies and microstructures are similar to those of the un-doped Ni(OH)$_2$.

In-situ doping of metal elements such as cobalt and other transition metals such as zinc and manganese, as well as heavy metals including cadmium in the nanostructured nickel hydroxide in accordance with the present invention will further improve the performance of nanostructured nickel electrodes. The major problems associated with poor performance in current nickel electrodes include (i) a swelling effect that occurs after repeated cycling, and (ii) poor conductivity between the active material and the porous nickel substrate. In attempts to solve these problems, cobalt oxide is presently intermixed with the active electrode paste, such that the cobalt oxide slowly dissolves into the nickel lattice in the surface of the nickel hydroxide powder. However, the cobalt is generally still present only on the surface of micron-sized particles. The present invention is advantageous in that it allows intermixing of the cobalt or other doped ion at the molecular level.

C. Nanostructured Particulate and Fibrous Ni(OH)$_2$ Doped With Aluminum

When aluminum is doped into nickel hydroxide using aluminum nitrate (Al(NO$_3$)$_3$·9H$_2$O) according to the above procedure, the crystal lattice of the β-Ni(OH)$_2$ is transformed into stable α-Ni(OH)$_2$. The transformation takes place gradually as a function of the amount of doping. For example, at low aluminum concentration, up to 5 atomic % the crystal structure is β-Ni(OH)$_2$; at higher aluminum concentrations, the crystals gradually transform into α-Ni(OH)$_2$; and only α-Ni(OH)$_2$ is found at 20 atomic % aluminum. Preliminary electrode performance testing shows that the capacity of the material can easily reach to a value 240 mAh/g (the DOE requirement for the nickel-metal hydride battery for the next generation of electrical vehicles is greater than 200 mAh/g.

Nanostructured Ni(OH)$_2$ synthesized in accordance with the present method can also exhibit a fibrous nanostructure. The nickel hydroxide powders after spray-drying show a spherical morphology by SEM, which as described above is an agglomeration of many nanostructured nickel hydroxide particles. Higher magnification of this material using a TEM indicate that depending on the synthesis parameters, the individual constituents can be either simply nanostructured particles as shown in FIG. 5A, or a mixture of nanostructured fibers with equiaxed nanostructured particles as shown in FIG. 5B.

Figure 5B:

The composite particles shown in FIG. 5B is obtained by synthesis in the presence of about 5 to 10, and up to 20 atomic % aluminum.

EXAMPLE 2

Nanostructured Manganese Dioxide

A. Nanostructured Particulate and Fibrous MnO$_2$

Nanostructured particles and highly porous, nanostructured fibers of manganese dioxide are synthesized by the reaction of an aqueous solution of an alkali metal salt of permanganate, e.g., potassium permanganate (KMnO$_4$) with manganese sulfate (MnSO$_4$) in the presence of nitric acid according to the following reaction:

$$2MnO_4^- + 3Mn^{+2} + 2H_2O \rightarrow 5MnO_2 + 4H^+ \quad (2)$$

Approximately 50 grams of nanostructured MnO$_2$ is synthesized by dissolving 55 grams of MnSO$_4$ in 188 mL deionized, distilled H$_2$O; and adjusting the pH of the solution to less than 1 by the addition of $HNO_3$. A reactant solution having 36.8 grams of $KMnO_4$ in 625 mL of deionized, distilled $H_2O$ is introduced into the reaction vessel containing the recirculated $MnSO_4/HNO_3$ mixture in the form of atomized spray while vigorously stirring the reaction vessel solution. As described above in connection with FIG. 2, the recirculated starting solution is co-atomized with the reactant solution. The molecular intermixing of the reactant solution and the starting solution results formation of a coffee-colored, colloidal suspension of nanostructured manganese dioxide. Analysis of a dried powder specimen of this suspension shows amorphous particles having a diameter of less than about 10 microns.

The colloidal suspension is then heat-treated at a temperature effective to remove water, preferably in the range from about 100 to 120° C. for 2 to 24 hours in the reaction vessel. Heat-treatment gradually transforms the amorphous particles into a random weave of nanostructured fibers. Complete transformation requires heat-treatment for about 24 hours. Heat-treatment is followed by ultrasonic processing of the colloidal suspension using a 550 watt ultrasonic horn, in order to minimize possible agglomeration of the manganese dioxide reaction products. The resulting nanostructured fibrous product is filtered and washed with distilled, deionized water to remove the undesired reaction by-products. Finally, the washed manganese dioxide fibrous powders are dispersed in a surfactant such as ethanol by ultrasonic processing, isolated by filtration, and dried in an oven at 100° C. for 4–12 hours.

Figure 6:
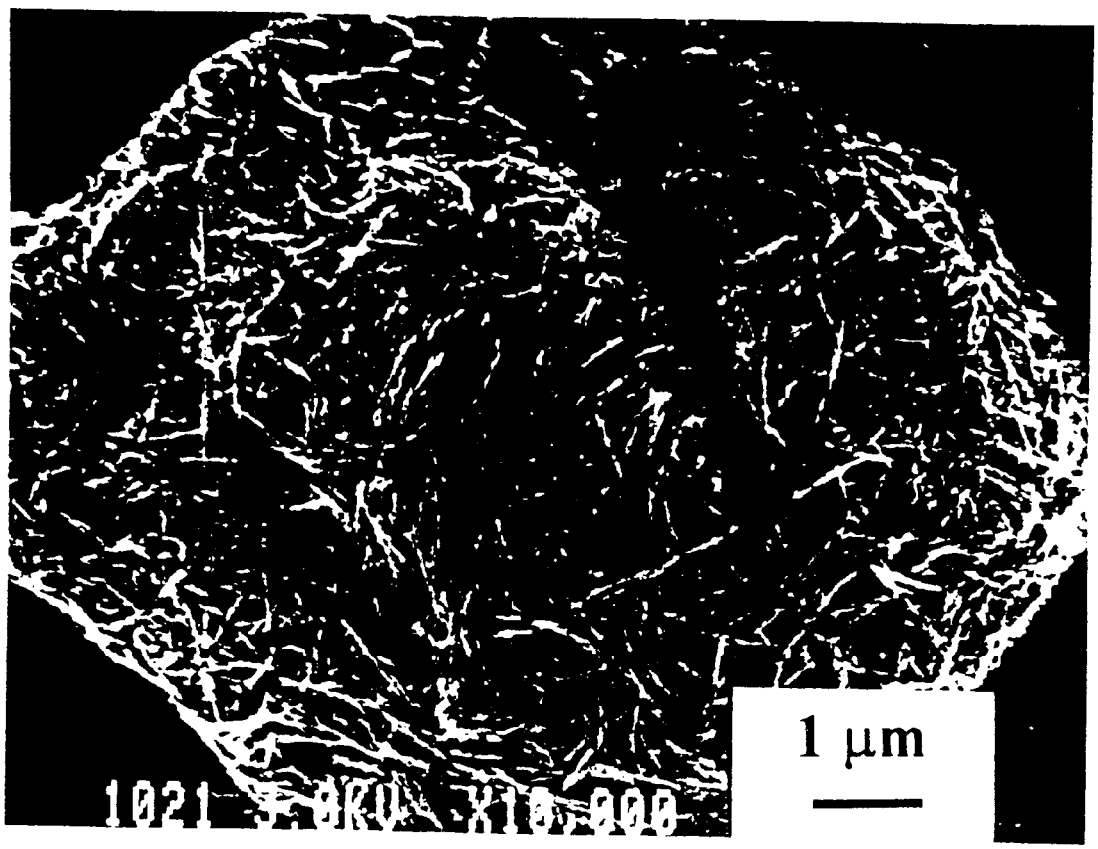
FIG. 6 is an SEM micrograph showing the bird's nest structure of a nanostructured manganese dioxide composite of the present invention.

Examination of these manganese dioxide fibrous powders by scanning electron microscopy (SEM) shows wave-like fibrous networks (FIG. 6). Although detailed resolution is not possible with SEM, the micrographs show a characteristic "bird's nest" morphology that arises as a result of the fiber networks, wherein each "bird's nest" has a diameter of about 10 microns and comprises an assembly of many individual nanostructured fibers.

B. Effects of Process Parameters on $MnO_2$ Crystal Structure

The formation of nanostructured manganese dioxide having a fibrous structure is effected by the proper selection of nitric acid concentration, the beat treatment temperature, and heat treatment duration. As described below, a pH of 1 or less, and a refluxing temperature during heat treatment in the range from about 60 to 100° C. for a few hours up to 48 hours will result in a bird's nest morphology consisting of fibers having diameters in the range from about 5 to 25 nm diameter, with each bird's nest having a diameter of about 10 microns. Systematic testing was conducted to determine the conditions for optimizing the hollandite manganese dioxide crystal structure in the chemical synthesis process. The tests show that manganese dioxide synthesized without the addition of nitric acid to the manganese sulfate solution displays negligible crystallinity, and may be regarded as essentially amorphous. In contrast, manganese dioxide synthesized with the addition of nitric acid have a well defined crystalline structure. As a consequence of this discovery, a standard pH of less than about 1 is used in the synthesis.

Figure 7A:
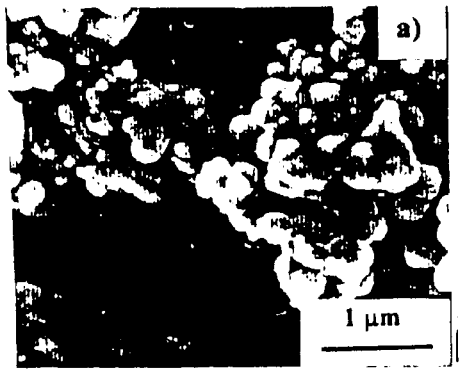
FIGS. 7A–7D are SEM micrographs showing the nanofibrous bird's-nest structure in accordance with the present invention growing after (A) precipitation, (B) heat treatment for 2 hours, (C) heat treatment for 8 hours, and (D) heat treatment for 24 hours.

The duration of the heat treatment is critical to the development of the nanostructured manganese dioxide. When the $KMnO_4$ reactant solution is co-atomized into the $MnSO_4$ solution in the presence of an oxidant, an amorphous powder forms. A typical SEM micrograph, FIG. 7A, shows that the amorphous powder comprises spherical agglomerates of approximately 0.1–0.5 micron diameter, with relatively smooth surfaces.

Figure 7B:
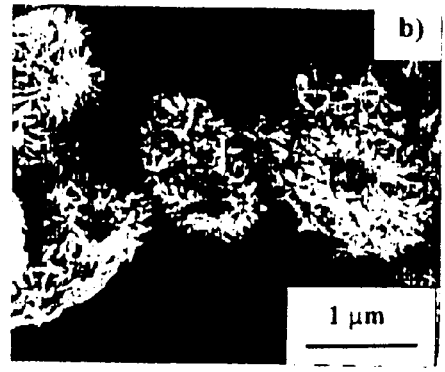

Heating this solution at reflux this solution at 60° C. for 2 hours increases the size of the original agglomerates to 0.5–3 microns. The surfaces of some agglomerated masses begin to show the development of a fibrous surface structure, with numerous fibers sticking out of the surfaces of the agglomerated mass, as shown in FIG. 7B. There are also fiber-free agglomerates present.

After 4 hours of heat treatment at the same temperature, the size of the agglomerated masses have grown to 1–5 microns, and many more display fibrous surface structures. No change is observed in the interior parts of the agglomerated particle masses. While the structure continues to develop more very small fibers, it appears that the largest fibers attain a maximum size of about 25 nm in cross-section and approximately 0.5 microns in length.

Figure 7C:
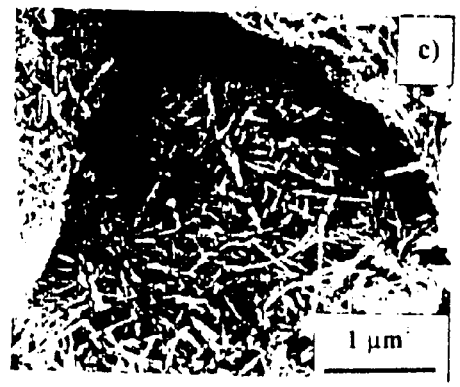

After 6–8 hours of heat treatment, many of the larger agglomerates display a well-defined fibrous structure, or "bird's-nest" morphology, which consists of a random, three-dimensional, open weave of fibers (FIG. 7C).

Figure 7D:
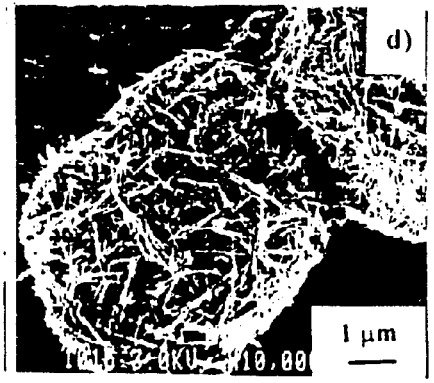

After 24 hours of heat treatment, the fibrous bird's nest structure is filly developed, with no visible remnants of the original nanoparticle agglomerates in their interiors. At this stage, a typical bird's-nest structure has a diameter of about 3 to 10 microns, comprising many interwoven nanofibers that extend throughout the entire structure (FIG. 7D).

Figure 8:
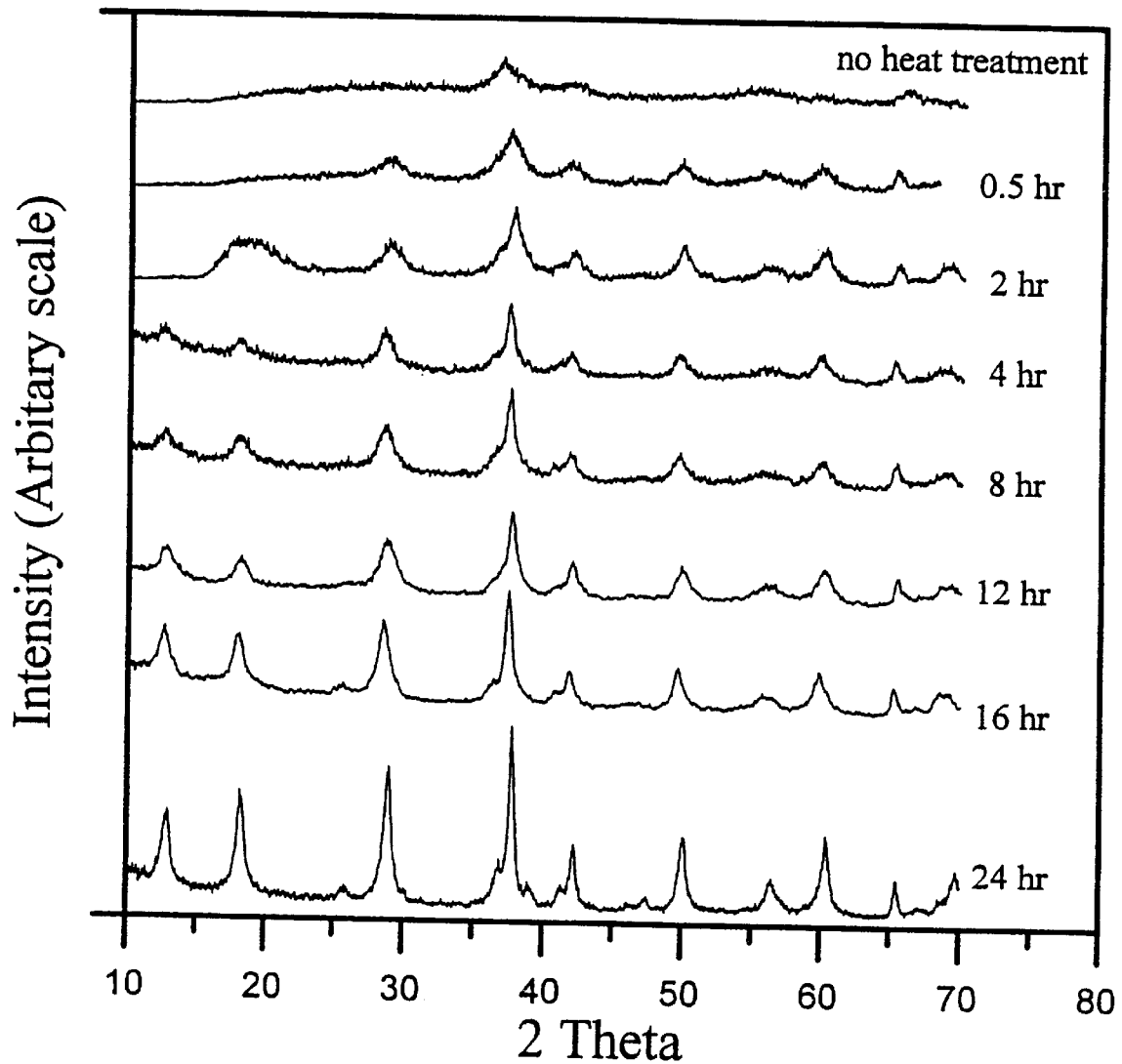
FIG. 8 is XRD data showing the growth of the nanostructured fibrous manganese dioxide in accordance with the present invention with increasing duration of heat treatment.

FIG. 8 shows the XRD data of the samples for the above reflux periods. The as-precipitated powders have a very broad peak at about 35° 2θ. After 2 hours under reflux, the (020) peak at about 66° 2θ and the (211)-type reflections at about 37.5° 2θ start to develop. These two peaks are related to the growth direction of the fibers. After heating this solution under reflux for 4 hours, all other major XRD peaks start to develop, typically, the (200) peak at about 17.5° 2θ. The width of the (200) peak is related to the diameters of the nanofibers. All these peaks are broad, indicating fibers having small dimensions. After 8 hours of heating under reflux, the XRD peaks continue to develop, but still remain relatively broad, showing some amorphous background in the diffraction pattern at this stage. After 16 hours of heating this solution under reflux, well-defined XRD peaks for the cryptomelane-type hollandite phase were obtained, and no significant amorphous background was detected. Consistent with the SEM studies, after 24 hours under reflux, the fibrous structure was filly developed, with fibers having diameters of about 5 to 25 nm and lengths from tens of nanometers up to 1 micron.

C. Nanostructured $MnO_2$ Doped With Co, Fe, and Pt

The general procedure for synthesizing nanostructured manganese dioxide containing selected doping elements is similar to that used in synthesizing undoped materials, further comprising the addition of an aqueous solution of an appropriate metal halide to the $MNSO_4$ solution. For example, in making 50 g of 0.4 M Co-doped powder, 123 mL of 7 M $Co(NO_3)_2 \cdot 6H_2O$ is added to the $MnSO_4$ solution before its reaction with the $KMnO_4$ oxidizer. Doping of cobalt into manganese dioxide also produced a fibrous birds-nest superstructure, but affected the manganese dioxide synthesis conditions, specifically the duration of the heat treatment time and the cobalt concentration as described below.

Figure 9A:
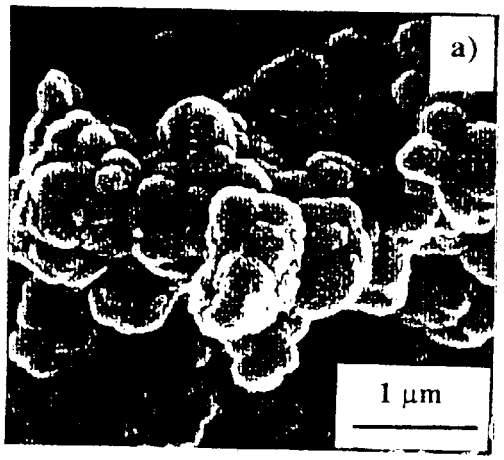
FIG. 9A–9D are SEM micrographs showing the growth of the nanostructured fibrous bird's-nest structure with cobalt doping after (A) precipitation, (13)heat treatment for 2 hours (C) heat treatment for 12 hours, and (D) heat treatment for 48 hours.
Figure 9B:
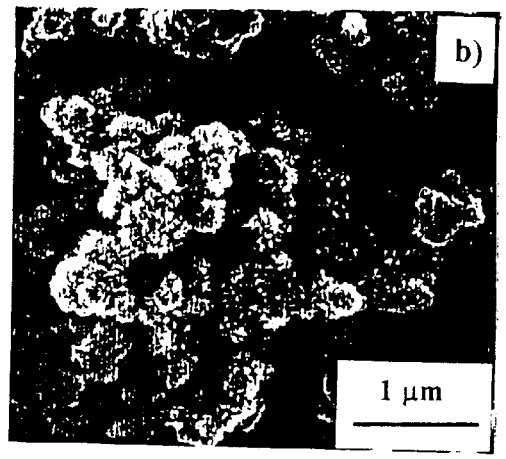
Figure 9C:
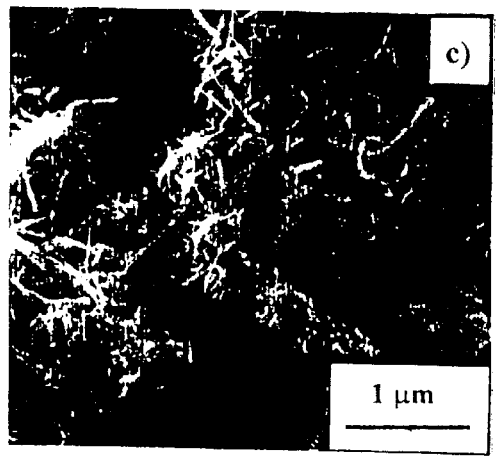
Figure 9D:
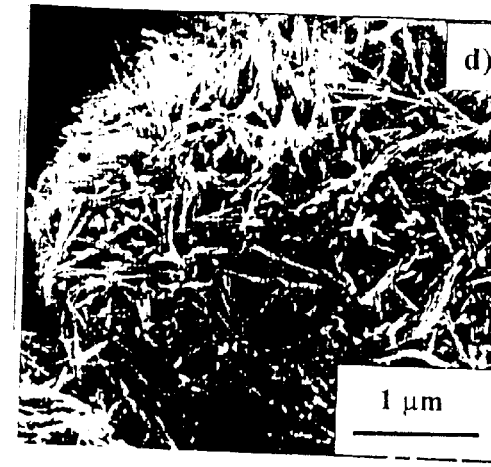

After precipitation, the cobalt-doped manganese dioxide is similar in appearance to that of the undoped manganese dioxide powder. The nanostructured particles have diameters of about 0.1 to 0.5 microns, and are in the form of spherical agglomerates (FIG. 9A). Even at this stage small, fiber-like structures have begun to appear on the surfaces of the agglomerated nanostructured particles. Upon heating at 60° C. for 2 hours, a coral-like structure develops (FIG. 9B), characterized by many very thin needle-like whiskers on the surfaces of the agglomerated particles. After 12 hours heating, the original coral-like structures has changed to a more agglomerated mass, with the initial appearance of the bird's nest morphology (FIG. 9C). The agglomerated mass has a size from about 0.5 microns up to about 3 microns. Whiskers have started to grow on the surface, while the interior of the agglomerates still retain a particle-like appearance. The size of these whiskers range from a few nanometers to about 20 nm in diameter, and several tens of nanometers up to about 0.5 microns in length. After 24 hours heating, the sizes of the agglomerated masses increase to about 3 to 10 microns, and are now composed mostly of interwoven fibers, forming the bird's-nest morphology. The maximum fiber diameter is about 25 nm, with lengths from in the range from several tens of nanometers up to the micron range. At this stage, however, there still remain a small portion of un-transformed coral-like particles of smaller size. After heating for 48 hours at the same temperature, a fully developed bird's-nest structure of interwoven fibers is obtained (FIG. 9D).

The duration of the heat treatment of the cobalt-manganese dioxide precipitate powder has a dramatic effect on the surface area of the powder. The as-precipitated material had a surface area of about 150 $m^2/g$. After 0.5 hour of heat treatment, however, the surface area increases to 180 $m^2/g$. This increase may be due to the initial nanoparticle agglomerates being more compacted, and the very small fibers at the agglomerate surface creating more surfaces for nucleation. The surface area of the powders begins to drop after 2 hours of heat treatment to 170 $m^2/g$. This drop continues until all the fibers are fully developed. The fully developed nanostructured fibrous Co-$MnO_2$ with 4.819 wt % of cobalt has a surface area of 120 $m^2/g$, whereas the iron-doped manganese dioxide can have a surface area up to about 280 $m^2/g$.

D. Morphological Characteristics of the Nanostructured $MnO_2$ (a) Direct Lattice and Atomic Imaging Studies Scanning electron microscopy of heat-treated manganese dioxide shows the existence of the birds nest morphologies assembled from manganese dioxide nanostructured fibers, as shown in FIG. 6. TEM shows that individual fibers are cylindrical monocrystals having fiber diameters in the range from about 5 to 50 nanometers, and lengths in the range from several tens of nanometers to about 1 to 3 microns. Structural analysis further reveals that the nanofibers are composed of b-axis oriented single crystals, which have the hollandite structure and a composition approximating $KMn_8O_{16}$. In this structure, about half of the available $K^+$ sites are occupied and the rest are empty. This type of manganese oxide is referred to as a molecular sieve, making it particularly attractive for catalytic and ion exchange purposes. In general, materials having such nanoscale pores make excellent cation-exchange materials. Moreover, with surface areas of greater than about 200 $m^2/g$, they are useful catalyst materials for oxidative reactions, and ionic/electronic conductors for high energy storage and rechargeable batteries.

Figure 10A:
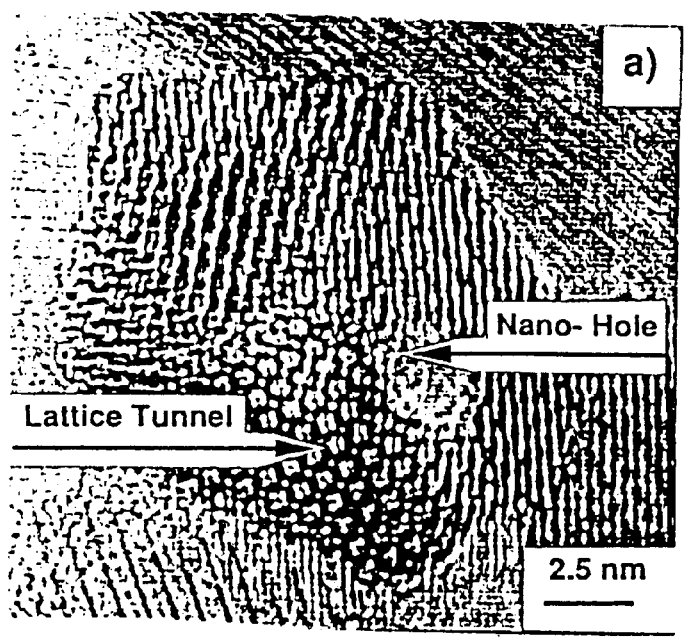
FIGS. 10A and 10B are high resolution transmission electron microscope (HRTEM) lattice images of a manganese dioxide nanostructured fiber in accordance with the present invention (A) viewed normal to the nanofiber cross section, wherein lattice tunnels and nanostructured holes are evident, and (B) an expanded view of lattice tunnels, wherein a schematic representation of unit cell (boundaries identified on right) is overlaid onto the HRTEM image (both figures show identical view).
Figure 10B:
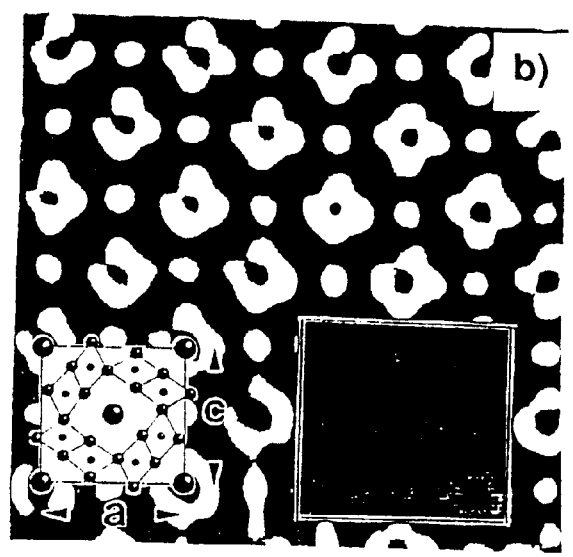

HRTEM was also used to analyze individual nanofibers from two directions. FIG. 10A is an HRTEM image of the fiber cross-section when viewed parallel to the nanofiber b-axis. FIG. 10B shows an expanded view of the lattice tunnels within the same image. A schematic of the atomic orientation has been overlaid onto the image with boundaries defined by the insert on the right. Lattice tunnels are observed in both the computer-simulated projection and the HRTEM image. All tunnels are double chains of Mn octahedra, with each chain pair joined at roughly right angles to form a square pattern (2×2). These molecular tunnels are 4.6 Å×4.6 Å in size. In contrast, much larger nanoscale holes or pores are also frequently observed, with diameters of 1–2 nm. An approximately 1 nm hole is seen in this particular image. These tunnels and holes are depicted conceptually in FIG. 11.

(b) Growth Characteristics of the Bird's Nest Structures

Figure 12A:
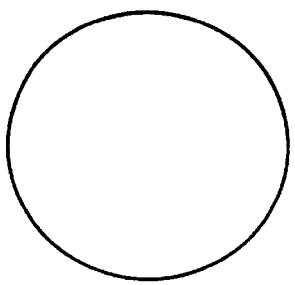
Figure 12B:
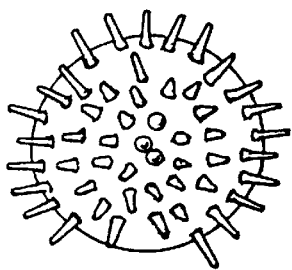
Figure 12C:
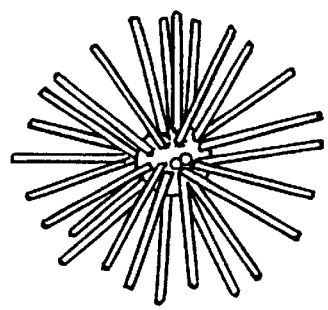
Figure 12D:
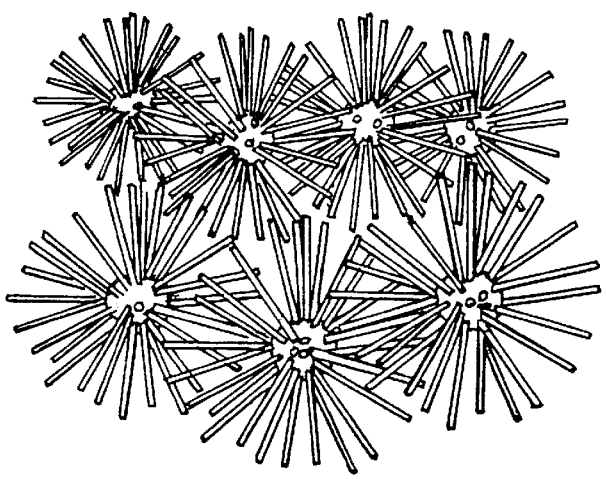
Figure 12E:
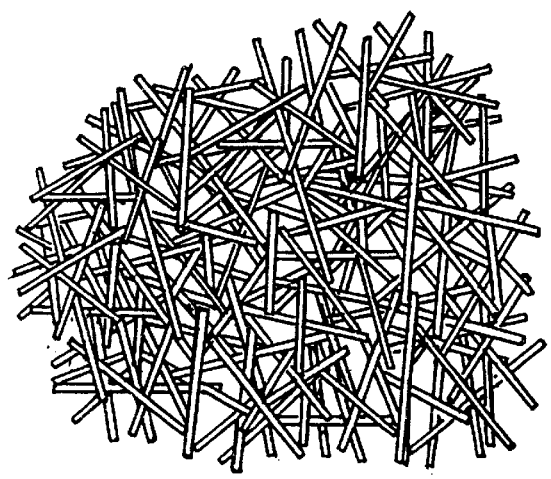

FIG. 12 further illustrates the growth of fibers at various stages, i.e., the smooth surfaces for as-precipitated manganese dioxide (FIG. 12A), nucleation of embryonic fibers starting at the surface of the agglomerated mass after heat treatment for a few hours (FIG. 12B), which grow into long fiber bundles (FIG. 12C), followed by interpenetration of the fibers (FIG. 12D), and finally a 3-dimensional, random, open-weave structure (FIG. 12E). An important factor in this growth is the downward growth of the nanostructured fibers into the amorphous substrate. Without being bound by theory, this may simply be a matter of short-range solid state diffusion through the substrate to the growing "root" of the nanofiber, since the crystalline structure is more stable than the amorphous state.

As a result, the chemical potentials of the manganese and oxygen ions will face a downward gradient towards any crystalline region in contact with the amorphous agglomerate. It may thus be concluded that the downward growth is an example of a coarsening mechanism operating in the solution phase, with the reaction driven primarily by the reduction in surface energy. A likely mechanism is fiber growth by gradual dissolution of the nanopowder in the liquid phase, followed by liquid phase transport of the dissolved species to the growing tips of the nanofibers. Such a simple coarsening mechanism should be common to many other material systems, so that the present invention is widely applicable to a variety of compositions.

E. Defects Structures (a) Structural Defects

Figure 11A:
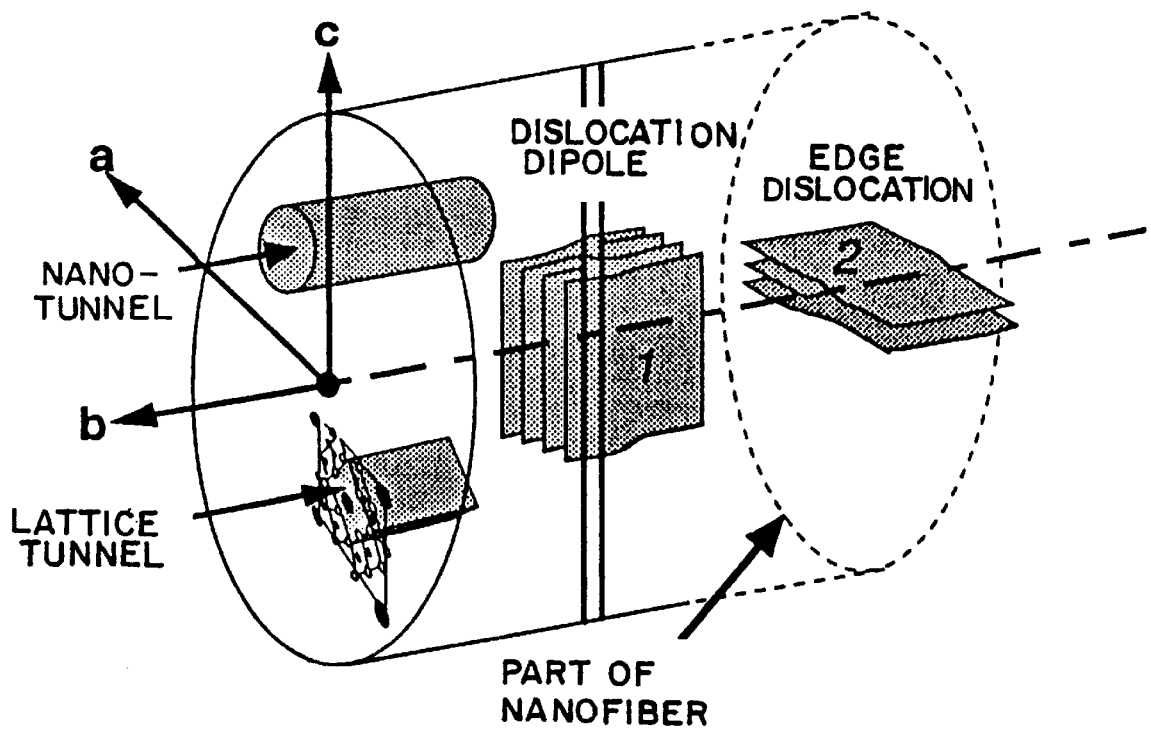
FIGS. 11A–11D are schematic representations of (A) the inner structure of a nanostructured fiber in accordance with the present invention showing edge dislocation dipoles, lattice tunnels and nanostructured hole, and (B) intrinsic active sites; (C) extrinsic active sites, and (D) hybrid active nanostructured fiber showing intrinsic and extrinsic sites.
Figure 11B:
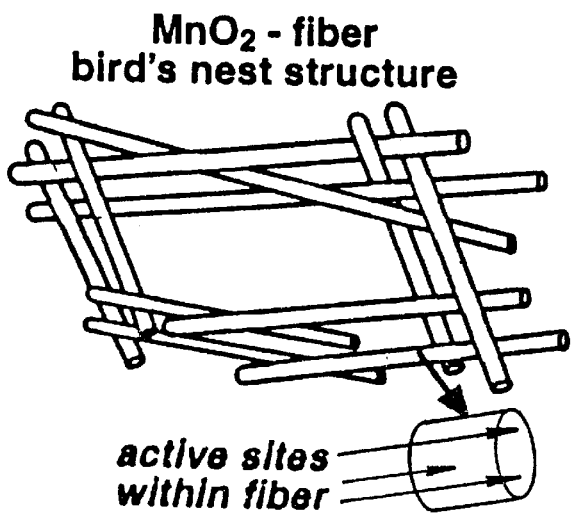
Figure 11C:
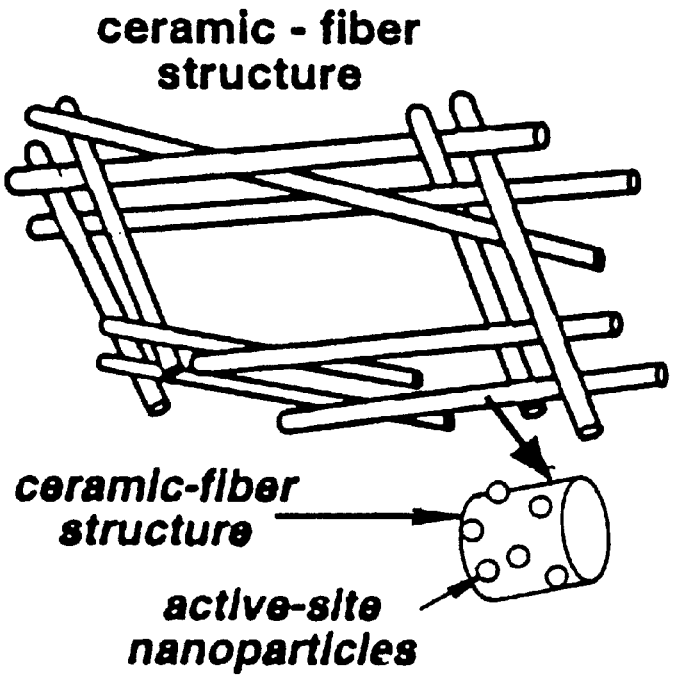
Figure 11D:
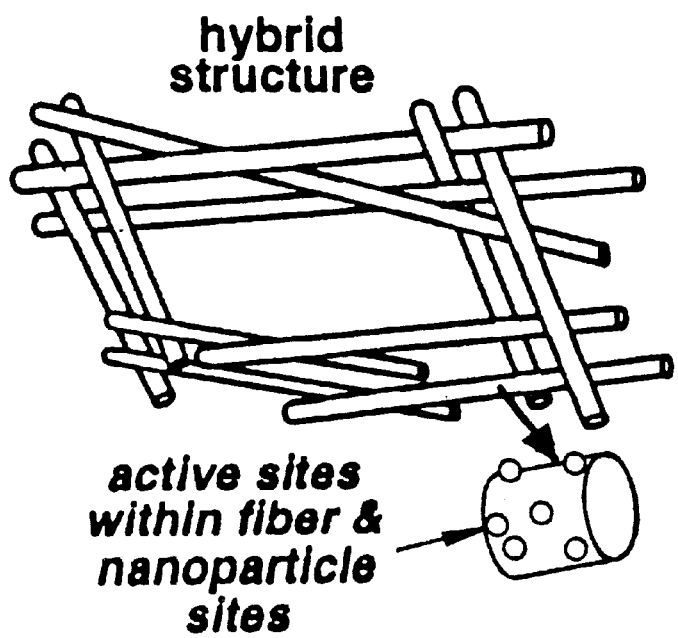
Figure 13A:
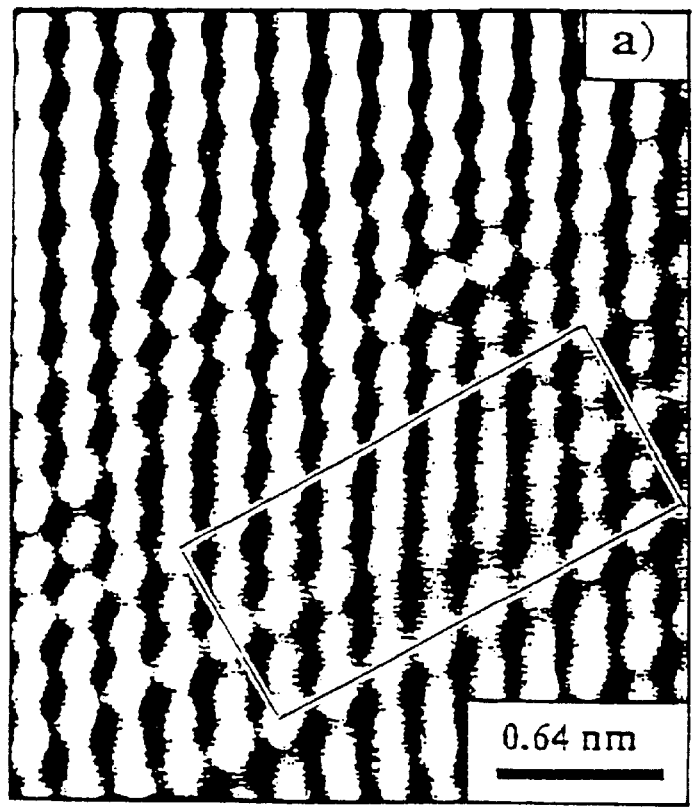
FIGS. 13A and 13B are (A) an HRTEM image of an $MnO_2$ nanostructured fiber in accordance with the present invention viewed perpendicular to the nanofiber cross-section; and (B) a schematic representation of the dislocation dipole shown in FIG. 13A.
Figure 13B:
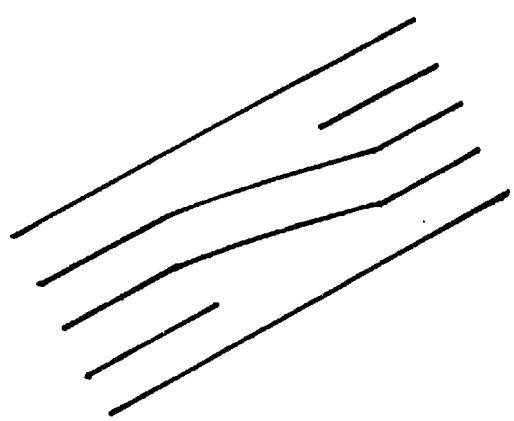
Figure 14A:
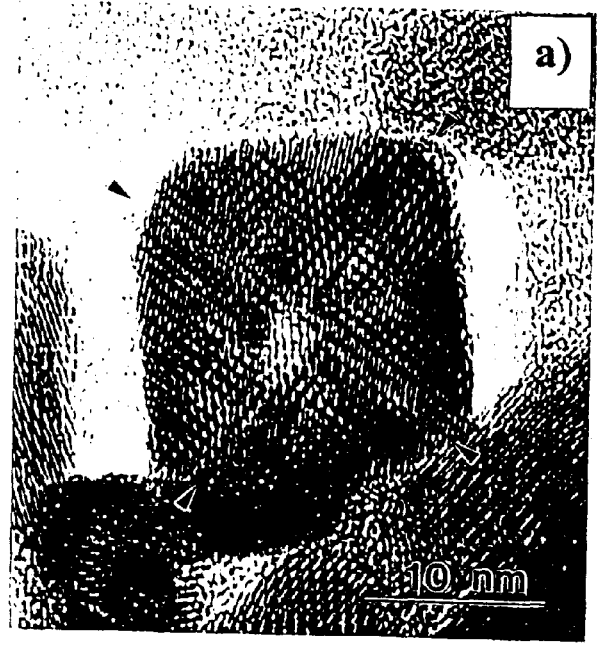
FIGS. 14A and 14B are HRTEM lattice images of $MnO_2$ in accordance with the present invention viewed parallel to the fiber axis showing (A) the terminus of the dislocation line showing four edge dislocations, wherein the axes of dislocation are indicated by the arrows; and (B) various shapes of the fiber surface.

Crystal imperfections, or defects within the nanostructured fibers are also observed. As shown in FIGS. 13A and 13B, edge dislocation dipoles (line defects) of opposite sign are seen when the fiber is viewed perpendicularly to its cylindrical surface (or tunnel direction). These edge dislocation dipoles will result in the formation of vacancy rows that provide paths for rapid diffusion of atomic and/or electronic species diametrically across the nanofibers. These dislocations terminate along a straight line, which is normal to the growth axis, or b-axis. Specifically, the dipole creates vacancy rows (cavities) normal to the nanofiber axis, as shown in FIG. 11A. Similarly, the termination of a dislocation line parallel to the growth axis is seen viewing parallel to the tunnel direction (the fiber cross-section) as shown in FIG. 14A. This dislocation line arises out of the intersection of four of the above-mentioned dislocation lines, which meet at the nanofiber center line.

The existence of dislocation dipoles in the nanofibers has implications with respect to the utility of this nanofibrous material. In ionic crystals, dislocations terminating inside the fibers will create effective charges associated with the merging dislocation sites. The sign of these charges is dependent on the atomic environment surrounding the cavities. Insertion of an element of opposite sign may invert the effective charge at the cavity by a simple sideways displacement to maintain charge balance. It can be shown that the effective charge created by a dislocation ending inside the crystal would have a triangular form.

Figure 14B:
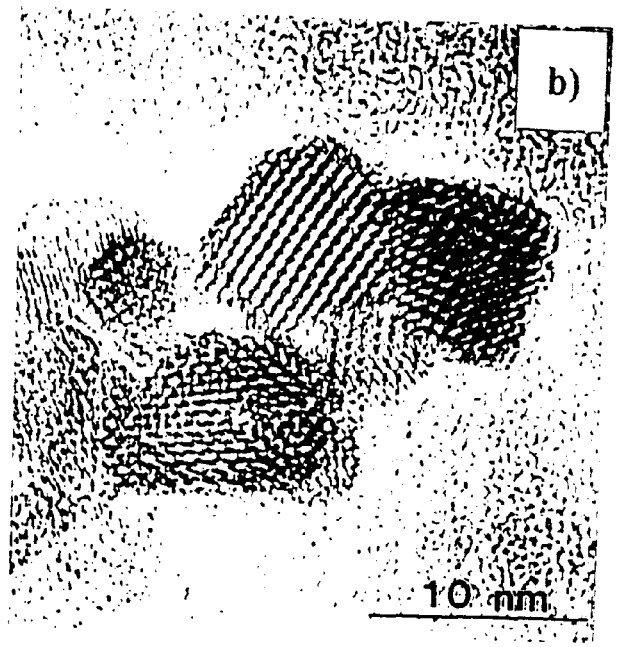

As these are ionic crystals, the existence of dislocations terminating inside the fiber will fundamentally create effective charges associated with the merging site of the dislocation, in this case diametrically opposed across the nanofiber. The 0.46 nm×0.46 nm square lattice tunnels are expected to be ideal for the insertion of lithium ions. Also, a high density of atomic steps (FIG. 14B) are easily identified when viewed parallel to the fiber-growing axis, which may function as active sites from an energy standpoint.

Other features of the novel structures in accordance with the present invention are the high degree of the porosity, including micro- and mesoporosity. The nature of the porosity can be altered by doping with different concentration of transition metal elements. A material of intrinsic defects is shown schematically in FIG. 11B, and materials with doped defect and hybrid defect features are shown schematically in FIGS. 11C and 11D.

(b) Porosity and Surface Area

Nanostructured fibrous manganese dioxide exhibits high surface area and relatively small pore size. Another important aspect of the synthetic material is that its properties can be greatly modified by changing dopant type and concentration. For example, by introducing iron as the dopant species, the measured BET surface area can be increased to 280 m²/g, with a pore volume of 0.323 cc/g. The pore volume was measured by introducing liquid nitrogen into the sample, where pore volume (Vp) is calculated by Vp= (weight of $N_2$)/(density of $N_2$). The pore volumes shown in the Table below, which shows the measured BET surface area of nanostructured fibrous manganese dioxide doped with various concentrations of cobalt, copper, and iron, indicate voids due to microporosity and mesoporosity.

| Dopant Conc. | Surface Area (m²/g) | Pore Max (Å) | Pore Volume (cc/g) |
|---|---|---|---|
| Co = 0.01M | 84 | 201 | 0.088 |
| Co = 0.1M | 105 | 203 | 0.136 |
| Co = 0.4M | 120 | 202 | 0.44 |
| Cu = 0.01M | 85 | 201 | 0.083 |
| Cu = 0.1M | 94 | 209 | 0.115 |
| Cu = 0.4M | 115 | 210 | 0.141 |
| Fe = 0.01M | 90 | 209 | 0.118 |
| Fe = 0.1M | 95 | 119 | 0.158 |
| Fe = 0.4M | 280 | 206 | 0.323 |

Figure 15A:
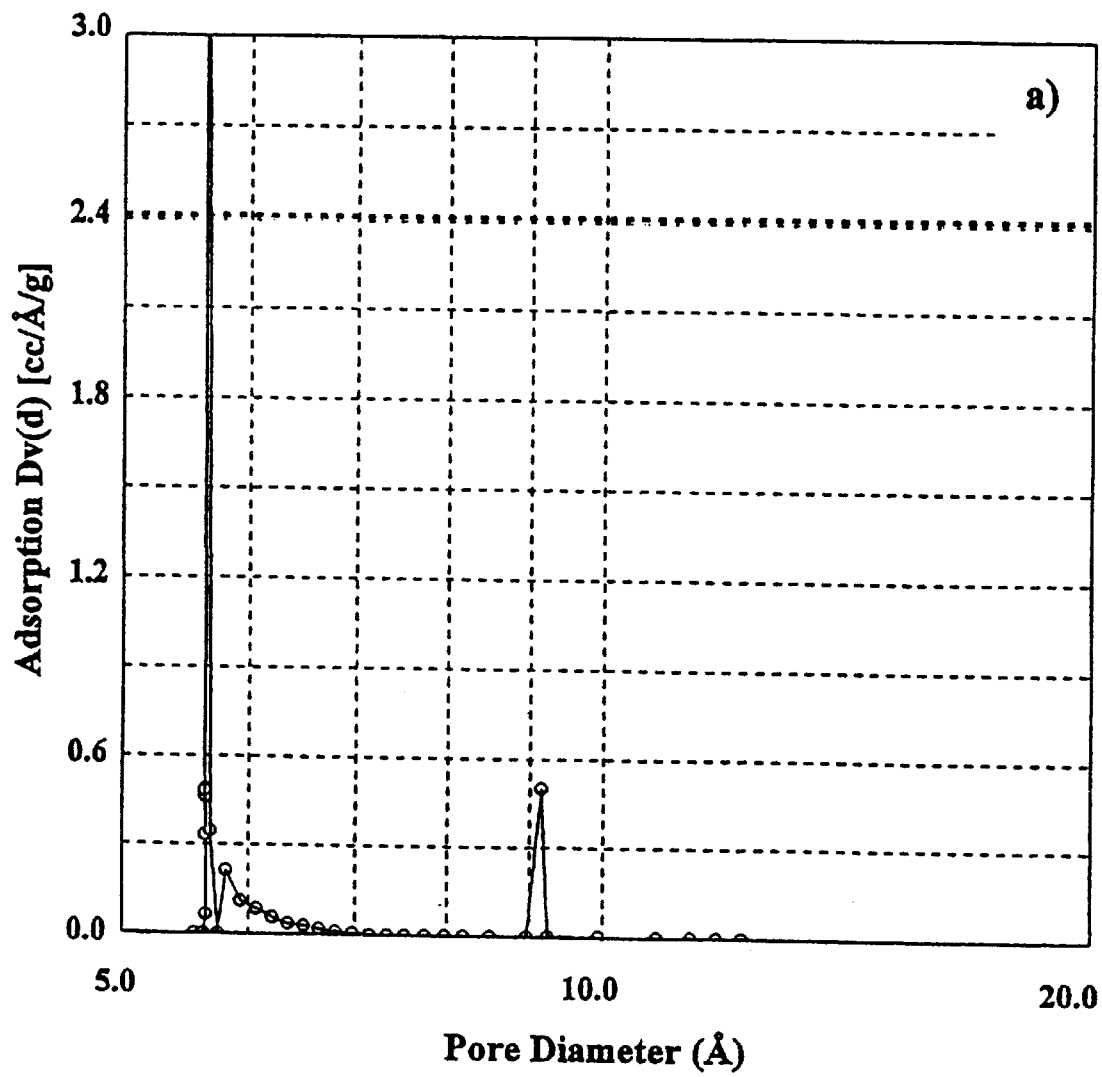
FIGS. 15A and 15B are pore size distributions of the nanostructured fibrous manganese dioxide material with (A) copper concentration of 0.1 M, and (B) copper concentration of 0.4 M.
Figure 15B:
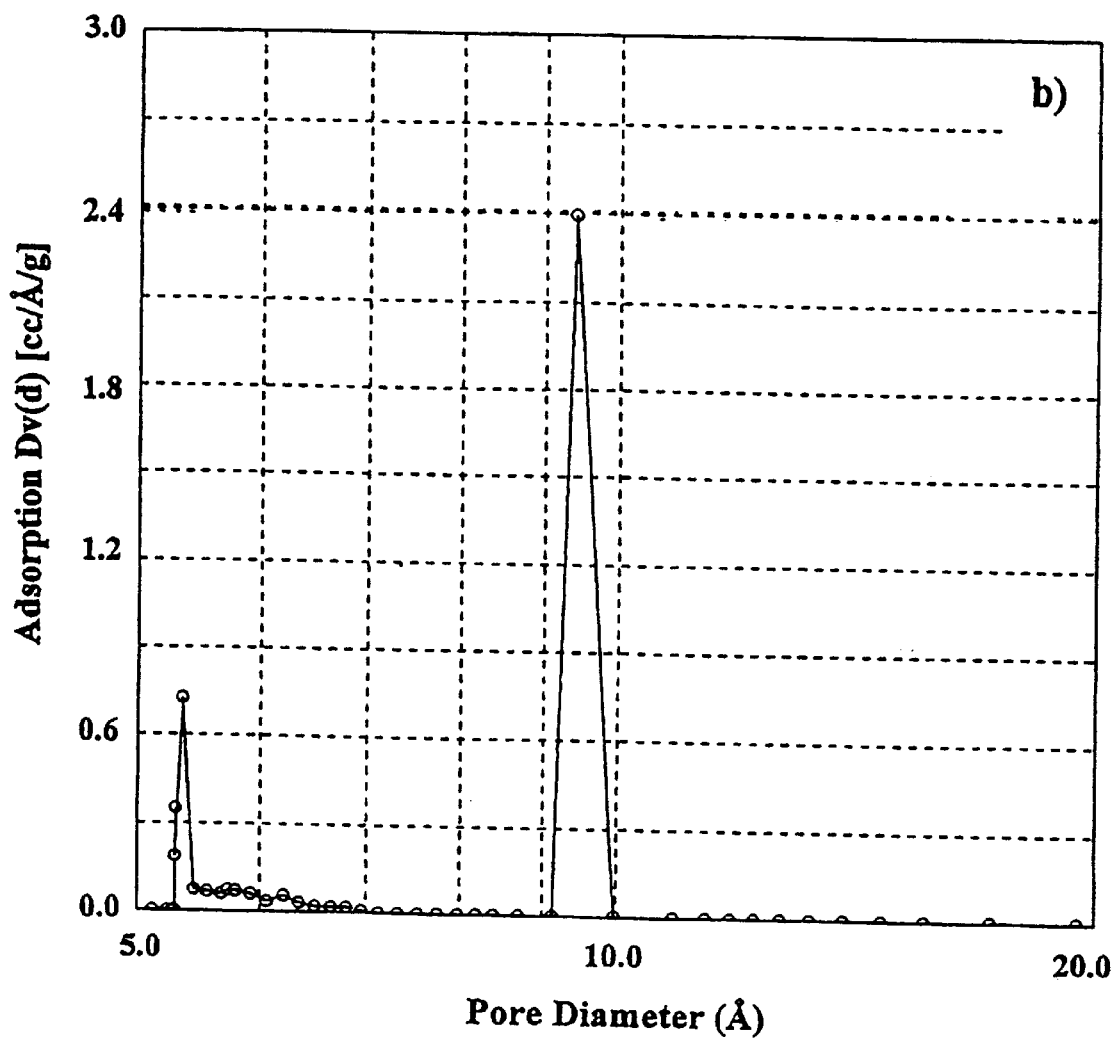

Microporosity is defined as porosity of pore diameters less than 10 Å. The microporosity can be related to the pore volume data. Typical porosity distributions for manganese dioxide with 0.1 M and 0.4 M of copper are shown in FIGS. 15A and 15B. For example, with 0.1 M copper doping, the pore diameters are found in two scales, 5.6 and 9.2 Å, with 85% of the pore size being distributed at 5.6 Å. When the concentration of copper is increased to 0.4 M, however, 70% of the pores are populated at 9.2 Å, which could be due to the fact that when the dopant concentration is increased, most 5.6 Å pores are obstructed by copper. The microporosity is attributed to the lattice defects, including large holes existing in the fibers.

Figure 16A:
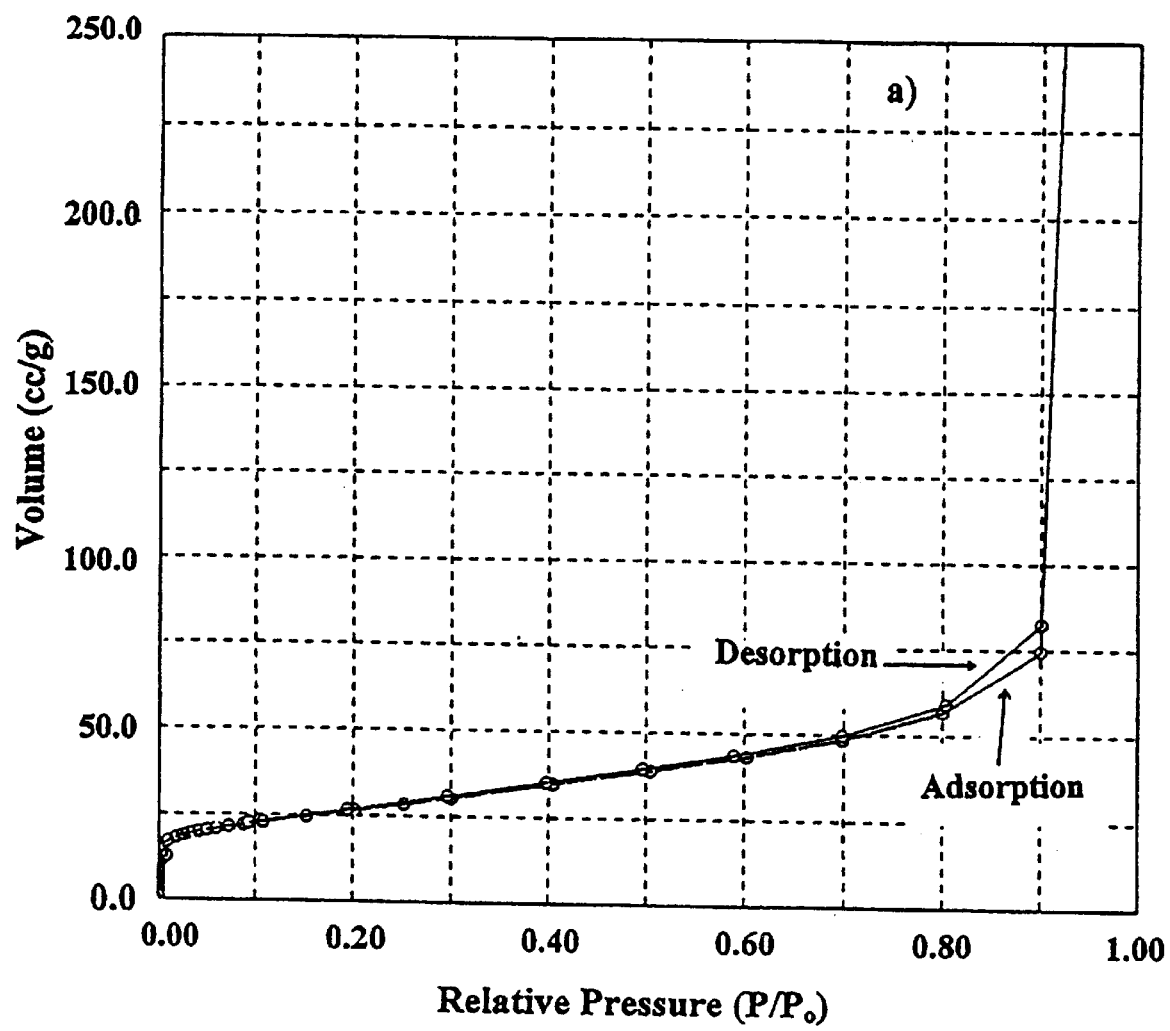
FIG. 16A and 16B are adsorption/desorption hysteresis curves of (A) 0.1 M copper doped in manganese dioxide, and (B) 0.4 M copper doped in manganese dioxide.
Figure 16B:
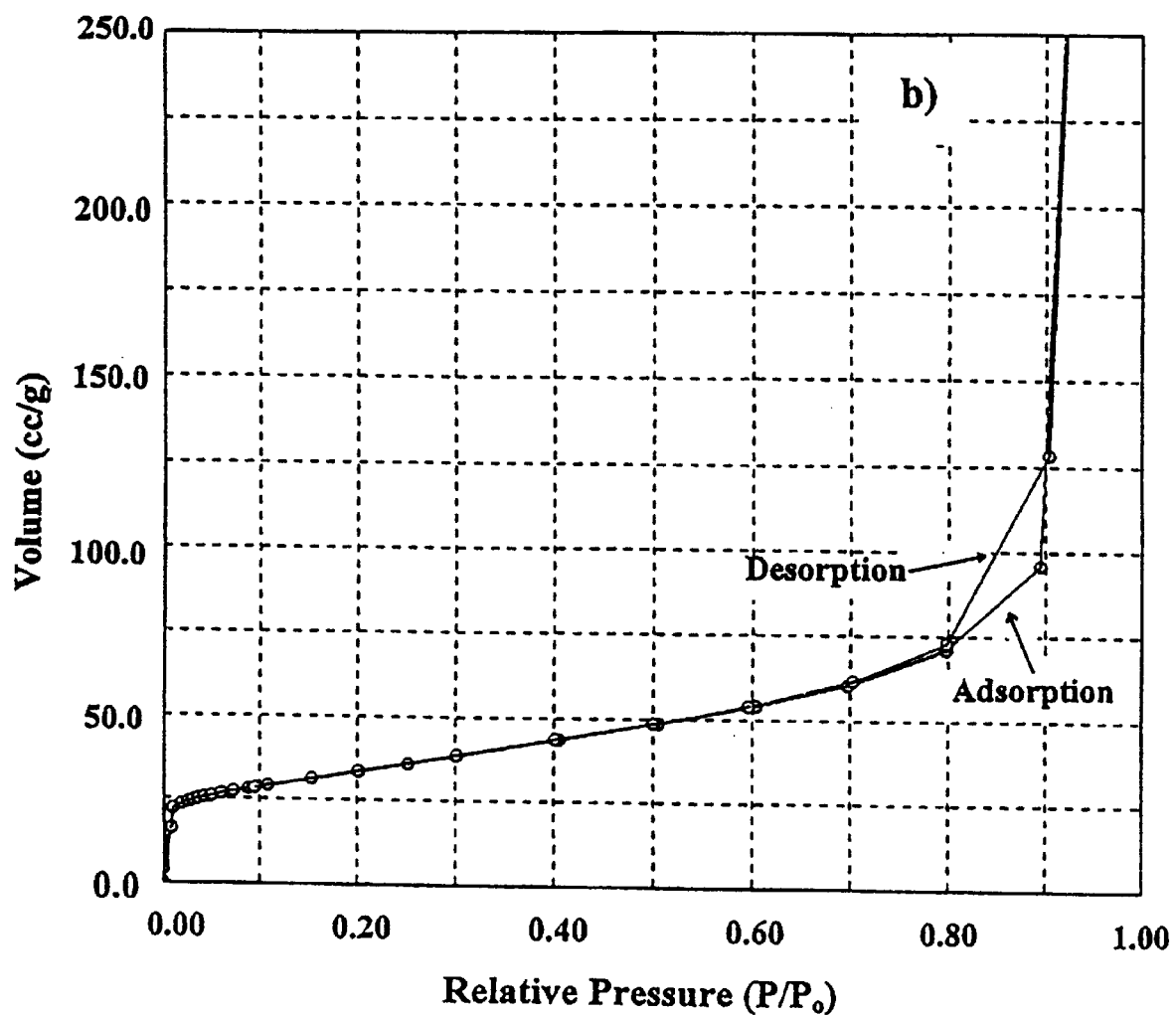

Mesoporosity is defined as porosity with pore diameters larger than 10 Å. The mesoporosity data is obtained by adsorption/desorption measurements. The mesoporosity found in the synthetic manganese dioxide is due to how these fibers are stacked or aggregated. FIGS. 16A and 16B illustrate the adsorption/desorption isotherms of 0.1 M and 0.4 M copper doped manganese dioxide samples. Both isotherms are Type II (e.g., cylindrical, slit, or square) according to the Brunauer et al. classification for materials with microporosity and mesoporosity set forth in the Journal to the American Chemical Society, Vol. 62, 1723 (1940).

The pore volume of micropores is close to 25 cc/g for both samples. Adsorption $P/P_o$ values in the range 0.1–0.95, which are associated with mesoporosity, increased by almost 55 cc/g for 0.1 M copper and 75 cc/g for 0.4 M copper. The increase in mesoporosity for 0.4 M copper is probably due to the joining of fibers by copper domains. Similarly, the hysteresis observed for the 0.4 M copper sample in the 0.8–0.9 $P/P_o$ range is associated with the presence of "ink bottle"-type pores, probably obstructed by the deposition of copper particles.

EXAMPLE 3

Nanostructured Yttria-Stabilized Zirconia

Factors determining the quality of the end-product $Y_2O_3$/ $ZrO_2$ powders include pH, solution concentration, nucleation and growth, and the concentration of additive surfactant. The starting materials are zirconyl chloride ($ZrOCl_2·8H_2O$), yttrium chloride ($YCl_3 H_2O$), and ammonium hydroxide ($NH_4OH$). The synthesis of yttria stabilized zirconia can be written according to the following reaction:

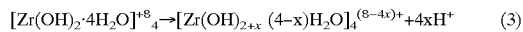

$$[Zr(OH)_2·4H_2O]^{+8}{}_4 \rightarrow [Zr(OH)_{2+x}(4-x)H_2O]_4^{(8-4x)+} + 4xH^+ \quad (3)$$

The general synthetic procedure is similar to that outlined above. An aqueous reactant solution of $ZrOCl_2·8H_2O$ and $YCl_3$ $6H_2O$ are co-atomized as shown in FIG. 2 into a reaction vessel containing a recirculated starting solution comprising $NH_4OH$ in distilled, deionized water, with vigorous stirring of the resultant aqueous mixture. $NH_4OH$ is continuously added into the reaction vessel as required to maintain the pH during the addition. The reaction product is then isolated by filtration, washed, and re-suspended, ultrasonicated, and then dried to obtain yttrium/zirconium hydroxide powders that are then heat treated at elevated temperatures to obtain the as-synthesized nanostructured $Y_2O_3/ZrO_2$ powders.

Preparation of 0.5 to 1 kg of nanostructured $Y_2O_3/ZrO_2$ powders containing 7 atomic % of $Y_2O_3$ starts with preparation of an aqueous solutions of 1120 grams of $ZrOCl_2·8H_2O$ and 250 grams of $YCl_3·6H_2O$ in 22.4 liters of deionized, distilled water. (Compositions having different atomic percents of yttria are prepared by varying the quantity of $YCl_3·6H_2O$ in the reactant solution.) Precipitation occurs with co-atomization of this aqueous salt solution into an aqueous solution of $NH_4OH$ in the reaction vessel via pressurized nozzles. $NH_4OH$ is also added as necessary to maintain the pH of the aqueous solution in the range of between about 8 to 11.

After addition of the aqueous salt solution is complete, the solution is stirred for an additional 2 to 4 hours to ensure that the reaction goes to completion. The precipitates thus formed are comprised of nanostructured yttrium/zirconium hydroxides.

After precipitation, the hydroxides are isolated by filtration and washed. The precipitates are then resuspended in distilled, deionized water, and treated with an ion-exchange resin to remove ammonium chloride and other unwanted by-products. The ion-exchange resin is removed by filtration through a coarse filter, and then the precipitates isolated by filtration through a finer-pored filter.

The nanostructured yttrium/zirconium hydroxides are then resuspended in distilled, deionized water and ultrasonicated using an intense ultrasonic probe (550 watts energy output, 6" length and 1" diameter). This is an important step in processing because it disintegrates the powder aggregates and introduces surface defects into the lattice of the nanocrystalline particles. Both deagglomeration and the existence of surface defects are important in influencing the performance of the active material in the nickel electrode.

At least one surfactant such as ethanol is then added to the hydroxide particles to ensure minimal particle aggregation during subsequent heat treatment. Heat treatment is in air at a temperature in the range from about 200° C. up to about 800° C. to obtain nanostructured $Y_2O_3/ZrO_2$ powders.

The nanostructured powder is then suspended in a solution of polyvinyl alcohol (PVA) in water, wherein the amount of PVA is 3–12 weight % on the basis of the $ZrO_2$, and the amount of water is 2 to 4 times the weight of the $ZrO_2$. The nanoparticle suspension is then spray-dried to form nanoporous spherical powder agglomerates having diameters in the ranged from about 1 to 200 microns, each agglomerate being an assembly of many of nanostructured $Y_2O_3/ZrO_2$ grains. Spray-drying the particles into this form facilitates subsequent powder handling and processing, for example, it ensures uniform flow characteristics of the agglomerated particles for thermal spray applications.

Structural analysis of the nanostructured $Y_2O_3/ZrO_2$ powders by x-ray powder diffraction spectroscopy indicates that the phases depend on the yttrium concentration. Without the addition of yttrium, only monoclinic zirconia is obtained. For a 2.5 atomic % yttria concentration, the powder contains both a monoclinic and tetragonal phase, while for a 5 atomic % yttria concentration, the dominant tetragonal phase coexists with a small amount of the monoclinic phase. For 7.5 atomic % yttria, the structure is cubic.

Figure 17A:
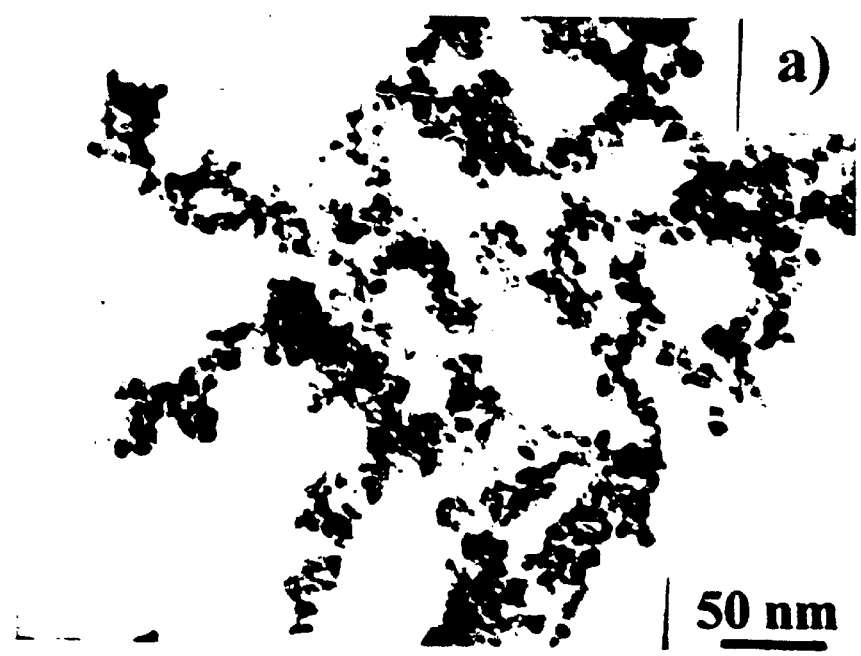
FIGS. 17A and 17B are (A) a TEM micrograph showing the particle morphology of nanostructured yttria-stabilized zirconia synthesized in accordance with the present invention; and (B) an HRTEM showing the lattice image of the particles in (A).
Figure 17B:
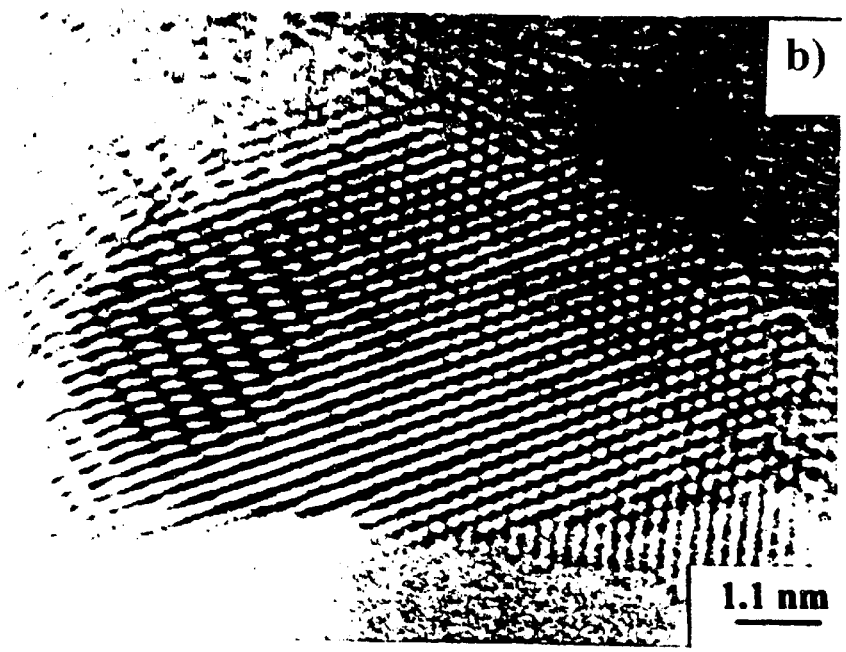

Morphological examination of the nanostructured $Y_2O_3/ZrO_2$ powders before spray-drying using TEM and HRTEM indicate that the nanostructured powders are faceted nanograms having grain sizes of less than about 10 nm, and an average grain size of about 5 nm (FIG. 17). These small grains are loosely agglomerated into larger agglomerates having diameters of less than about 500 nm. Direct lattice images of an individual nanoparticle in a high resolution electron microscope reveals that the interplanar distance of the crystal lattice is larger near the grain boundary than in the grain interior. These images also reveal the existence of many surface steps. This phenomena is highly important in catalytic applications, since these incomplete surfaces are more energetic and provide a high density of catalytic sites.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A nanostructured oxide or hydroxide synthesized by:
   providing an aqueous starting solution and an aqueous reactant solution;
   co-atomizing the aqueous reactant solution into the aqueous starting solution, thereby precipitating a nanostructured oxide or hydroxide powder from the mixture of the aqueous starting and reactant solutions;
   heat treating the nanostructured oxide or hydroxide powder to produce a heat-treated nanostructured oxide or hydroxide; and
   ultrasonicating the heat-treated nanostructured oxide or hydroxide, wherein the ultrasonicated nanostructured oxide or hydroxide is in the form of a random, interconnected open-weave assembly of fibers, the fibers having diameters of less than about 100 nm.

2. The nanostructured oxide or hydroxide of claim 1, wherein
   the nanostructured oxide or hydroxide comprises nickel, manganese, yttrium, zirconium, aluminum, silicon, magnesium, cobalt, vanadium, molybdenum, zinc, silver, titanium, iron, cobalt, copper, tungsten, or other rare earth metal.

3. The nanostructured oxide or hydroxide of claim 1, wherein
   the nanostructured oxide or hydroxide is nickel hydroxide, nickel hydroxide doped with at least one of aluminum, cobalt, cadmium, manganese, or zinc, manganese oxide, manganese oxide doped with at least one of cobalt, iron, or platinum, yttrium oxide, zirconium oxide, or yttria-stabilized zirconium oxide.

4. The nanostructured oxide or hydroxide of claim 1, wherein
   the nanostructured fibers have an aspect ratio greater than about 10.

5. The nanostructured oxide or hydroxide of claim 1, wherein
   the nanostructured fibers are spaced between about 0.5 to 200 nm apart from each other.

6. The nanostructured oxide or hydroxide of claim 5, wherein
   the nanostructured fibers are spaced from about 5 to 50 nm apart.

7. The nanostructured oxide or hydroxide of claim 1, wherein
   the porosity of the nanostructured fiber assembly is greater than about 60 volume percent.

8. The nanostructured oxide or hydroxide of claim 7, wherein
   the porosity of the nanostructured fiber assembly is greater than about 80 volume percent.

9. The nanostructured oxide or hydroxide of claim 1, further comprising
   nanostructured particles, wherein the nanostructured particles have diameters of less than about 100 nm.

10. The nanostructured oxide or hydroxide of claim 9, wherein
    the nanostructured particles have diameters in the range from about 1 to 100 nm.

11. The nanostructured oxide or hydroxide of claim 10, wherein
    the nanostructured particles are in the form of agglomerates, wherein the agglomerates have diameters in the range from about 0.1 to 200 microns.

12. The nanostructured oxide or hydroxide of claim 11, wherein
    the agglomerates are porous, the pores having diameters in the range from about 0.5 to 20 nm.

13. The nanostructured oxide or hydroxide of claim 11, wherein
    the agglomerates of nanostructured particles comprise from about 60 to 90 percent by volume of the total nanostructured oxide or hydroxide.

14. The nanostructured oxide or hydroxide of claim 9, comprising
    manganese dioxide or nickel hydroxide.

15. A composition of matter, comprising
    nanostructured particulate or fibrous nickel hydroxide, wherein the nickel hydroxide particles or fibers have diameters of less than about 100 nm.

16. The composition of claim 15,
the nanostructured nickel hydroxide is doped with at least one metal.

17. The composition of claim 16, wherein
the at least one metal is cobalt, aluminum, platinum, copper, titanium, tungsten, an alkali metal, a noble metal, or a semi-conducting metal.

18. A composition of matter, comprising
nanostructured particulate or fibrous manganese dioxide, wherein the manganese dioxide particles or fibers have diameters of less than about 100 nm.

19. The composition of claim 18,
the nanostructured manganese dioxide is doped with at least one metal.

20. The composition of claim 19, wherein
the at least one metal is cobalt, aluminum, platinum, copper, titanium, tungsten, an alkali metal, a noble metal, or a semi-conducting metal.

21. A composition of matter, comprising
nanostructured fibrous zirconium oxide, wherein the zirconium oxide fibers have diameters of less than about 100 nm, and the fibers are in the form of a random, interconnected open-weave assembly.

22. The composition of claim 21,
the nanostructured zirconium oxide further comprises nanostructured yttrium oxide.

23. Nanostructured composite materials, comprising
at least one random interconnected open-weave assembly of nanostructured fibers, wherein the nanostructured fibers have diameters of less than about 100 nm; and
at least one agglomerate of nanostructured particles adjacent or partially or completely within the at least one assembly, wherein the nanostructured particles have diameters of less than about 100 nm.

24. The nanostructured composite materials of claim 23, wherein
the nanostructured fibers have an aspect ratio greater than about 10.

25. The nanostructured composite materials of claim 23, wherein
the nanostructured fibers are spaced between about 0.5 to 200 nm apart from each other.

26. The nanostructured composite materials of claim 25, wherein
the nanostructured fibers are spaced about 5 and 50 nm apart.

27. The nanostructured composite materials of claim 23, wherein
the porosity of the at least one nanostructured fiber assembly is greater than about 60 volume percent.

28. The nanostructured composite materials of claim 23, wherein
the porosity of the nanostructured fiber assembly is greater than about 80 volume percent.

29. The nanostructured oxide or hydroxide of claim 28, wherein
the fibers have diameters of less than about 50 nm.

30. The nanostructured composite materials of claim 23, wherein
the agglomerates of nanostructured particles have diameters in the range from about 0.1 to 200 microns.

31. The nanostructured composite materials of claim 23, wherein
the agglomerates of nanostructured particles comprise from about 60 to 90 percent by volume of the nanostructured material.

32. The nanostructured composite materials of claim 23, comprising oxides or hydroxides of nickel, manganese, yttrium, zirconium, aluminum, silicon, magnesium, cobalt, vanadium, molybdenum, zinc, silver, titanium, vanadium, iron, cobalt, copper, tungsten, or other rare earth metals.

33. The nanostructured composite materials of claim 23, comprising
manganese dioxide or nickel hydroxide.

34. The nanostructured composite materials of claim 23, wherein
the composites have a high percolation rate and a high density of active sites.

35. Nanostructured composite materials, comprising
at least one random, interconnected open-weave assembly of nanostructured fibers, wherein the nanostructured fibers have diameters of less than about 100 nm; and
nanostructured particles adjacent or partially or completely within the at least one assembly, wherein the nanostructured particles have diameters of less than about 100 nm.

36. The nanostructured composite materials of claim 35, wherein
the nanostructured fibers have an aspect ratio greater than about 10.

37. The nanostructured composite materials of claim 35, wherein
the nanostructured fibers are spaced between about 0.5 to 200 nm apart from each other.

38. The nanostructured composite materials of claim 35, wherein
the nanostructured fibers are spaced about 5 and 50 nm apart.

39. The nanostructured composite materials of claim 35, wherein
the porosity of the at least one nanostructured fiber assembly is greater than about 60 volume percent.

40. The nanostructured composite materials of claim 35, wherein
the porosity of the nanostructured fiber assembly is greater than about 80 volume percent.

41. The nanostructured composite materials of claim 35, wherein
the composites have a high percolation rate and a high density of active sites.

42. Nanostructured materials, comprising
at least one random, interconnected open-weave assembly of nanostructured fibers, wherein the nanostructured fibers have diameters of less than about 100 nm.

43. The nanostructured materials of claim 42, wherein
the nanostructured fibers have an aspect ratio greater than about 10.

44. The nanostructured materials of claim 42, wherein
the nanostructured fibers are spaced between about 0.5 to 200 nm apart from each other.

45. The nanostructured materials of claim 42, wherein
the nanostructured fibers are spaced about 5 and 50 nm apart.

46. The nanostructured materials of claim 42, wherein
the porosity of the at least one nanostructured fiber assembly is greater than about 60 volume percent.

47. The nanostructured materials of claim 42, wherein
the porosity of the nanostructured fiber assembly is greater than about 80 volume percent.

48. The nanostructured materials of claim 42, wherein the composites have a high percolation rate and a high density of active sites.

49. The nanostructured materials of claim 42, wherein the composites have a high percolation rate and a high density of active sites.

50. The nanostructured materials of claim 42, comprising an oxide or hydroxide of nickel, manganese, yttrium, zirconium, aluminum, silicon, magnesium, cobalt, vanadium, molybdenum, zinc, silver, titanium, iron, cobalt, copper, tungsten, other rare earth metals, or a combination thereof.

51. A composition of matter, comprising nanostructured, particulate or fibrous zirconium oxide, wherein the zirconium oxide further comprises nanostructured yttrium oxide, and wherein the particles or fibers have diameters of less than about 100 nm, and the fibers are in the form of a random, interconnected open-weave assembly.

* * * * *

UNITED STATES PATENT AND TRADEMARK OFFICE
CERTIFICATE OF CORRECTION

PATENT NO. : 6,162,530
DATED : December 19, 2000
INVENTOR(S) : Xiao et al.

It is certified that error appears in the above-identified patent and that said Letters Patent is hereby corrected as shown below:

Title page,
Item [57], ABSTRACT,
Line 13, after "route" delete "is disclosed"

Column 3,
Line 3, after "However," delete "a-nickel" and insert therefor -- α-nickel --
Line 18, after "$SiO_2$," delete "$Fe2O_3$," and insert therefor -- $Fe_2O_3$, --

Column 6,
Line 53, after "precipitation" delete "(13)" and insert therefor -- (B) --

Column 13,
Line 37, after "has a" delete "P-Ni(OH)$_2$" and insert therefor -- β-Ni(OH)$_2$ --

Column 14,
Line 2, after "possesses a" delete "P-Ni(OH)$_2$" and insert therefor -- β-Ni(OH)$_2$ --

Column 15,
Line 43, after "the" delete "beat" and insert therefor -- heat --
Line 46, after "100$^0$" delete "C." and insert therefor -- C --

Column 21,
Line 8, after "200$^0$" delete "."
Line 9, after "800" delete "."

Signed and Sealed this

Twenty-fourth Day of August, 2004

JON W. DUDAS
*Director of the United States Patent and Trademark Office*